US009574898B2

(12) United States Patent
Tuukkanen

(10) Patent No.: US 9,574,898 B2
(45) Date of Patent: Feb. 21, 2017

(54) METHOD AND APPARATUS FOR PROVIDING SHARING OF NAVIGATION ROUTE AND GUIDANCE INFORMATION AMONG DEVICES

(71) Applicant: HERE GLOBAL B.V., Veldenhoven (NL)

(72) Inventor: Marko Tapio Tuukkanen, Schlenzer (DE)

(73) Assignee: HERE GLOBAL B.V., Veldhoven (NL)

( * ) Notice: Subject to any disclaimer, the term of this patent is extended or adjusted under 35 U.S.C. 154(b) by 77 days.

(21) Appl. No.: 14/220,963

(22) Filed: Mar. 20, 2014

(65) Prior Publication Data

US 2015/0268057 A1 Sep. 24, 2015

(51) Int. Cl.
G01C 21/36 (2006.01)
G01C 21/34 (2006.01)

(52) U.S. Cl.
CPC ..... *G01C 21/3661* (2013.01); *G01C 21/3438* (2013.01)

(58) Field of Classification Search
CPC ............... H04M 1/66; H04M 1/72552; H04M 2250/10; H04M 2250/22; H04M 2250/60; G01C 21/3661; G01C 21/3438
See application file for complete search history.

(56) References Cited

U.S. PATENT DOCUMENTS 7,412,325 B1 8/2008 Tannenbaum et al.
8,588,814 B2 11/2013 Jayanthi
2009/0063039 A1 3/2009 Tsai
2009/0186629 A1 7/2009 Soelberg et al.
2012/0221241 A1 8/2012 Nurmi
(Continued)

FOREIGN PATENT DOCUMENTS

EP 1595112 A1 11/2005
EP 2 290 322 A1 3/2011
(Continued)

OTHER PUBLICATIONS

Waze, "IPhone User Manual", Manual, accessed on Dec. 30, 2013, retrieved from https://wiki.waze.com/wiki/IPhone_User_Manual:#Ping.5CChit_Chat, 80 pages.
(Continued)

*Primary Examiner* — Basil T Jos
(74) *Attorney, Agent, or Firm* — Ditthavong & Steiner, P.C.

(57) ABSTRACT

An approach is provided for processing and/or facilitating a processing of at least one request to share navigation routing information from at least one first device to at least one second device. The approach involves determining that at least one application associated with the navigation routing information is not installed on the at least one second device. The approach also involves causing, at least in part, a querying for at least one communication account associated with the at least one second device. The approach further involves causing, at least in part, a transmission of at least one capture of the navigation routing information to the at least one second device using that least one communication account.

20 Claims, 18 Drawing Sheets

(56) References Cited

U.S. PATENT DOCUMENTS

2013/0245939 A1    9/2013  Chang et al.
2014/0310348 A1*  10/2014  Keskitalo et al. ............ 709/204

FOREIGN PATENT DOCUMENTS

JP    2001317953 A    11/2001
WO   2013152783 A1   10/2013

OTHER PUBLICATIONS

Google Inc, "My Tracks", Mobile Application, accessed on Dec. 30, 2013, retrieved from https://play.google.com/store/apps/details?id=com.google.android.maps.mytracks, Aug. 9, 2013, 2 pages.

International Preliminary Report on Patentability for International Application No. PCT/EP2014/077522, mailed Feb. 23, 2015, 4 pages.

Notification of Transmittal of Translation of the International Preliminary Report on Patentability (Chapter I or Chapter II) along with Written Opinion of the International Searching Authority for International Application No. PCT/EP2014/077522, mailed Feb. 23, 2015, 8 pages.

* cited by examiner

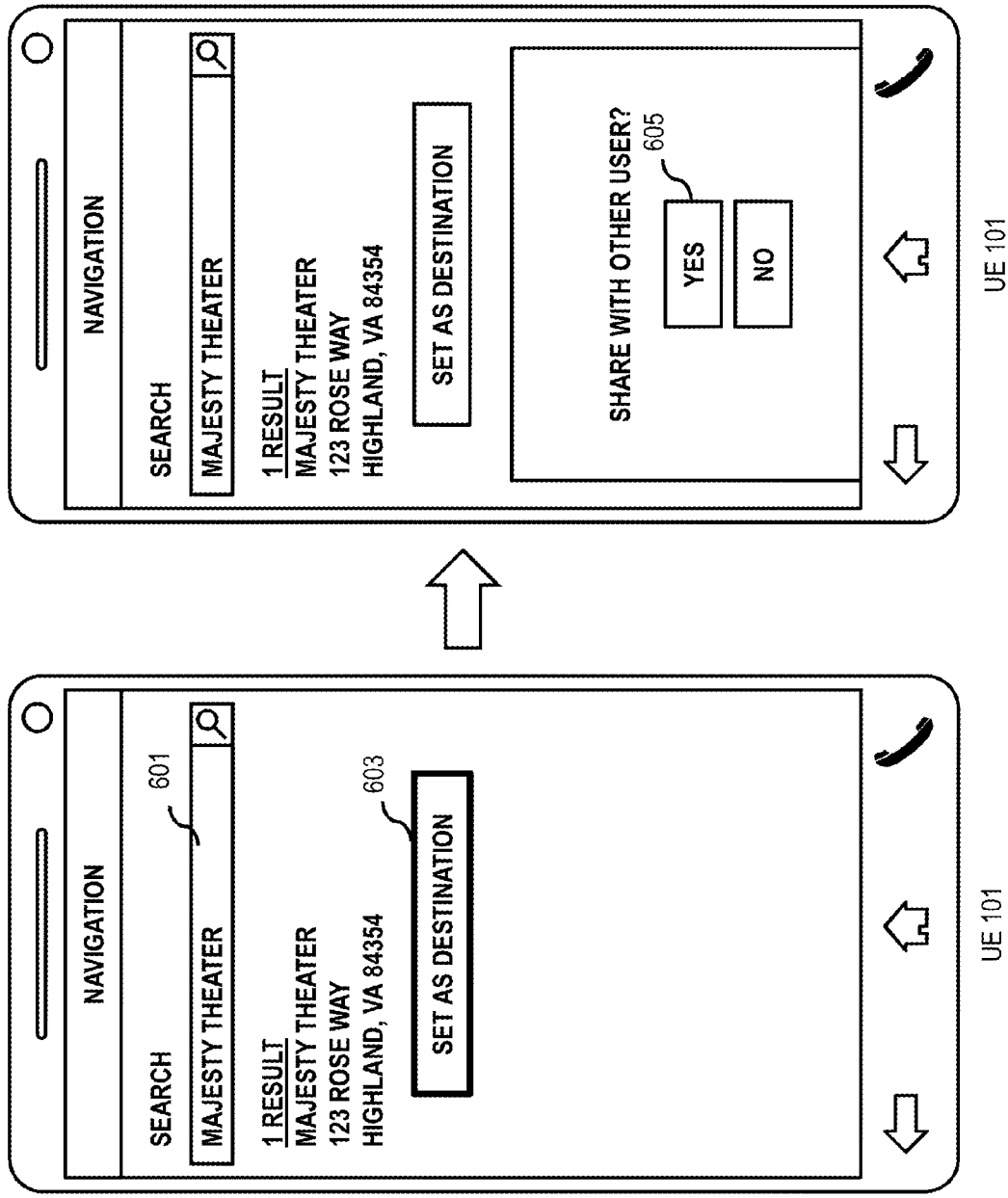

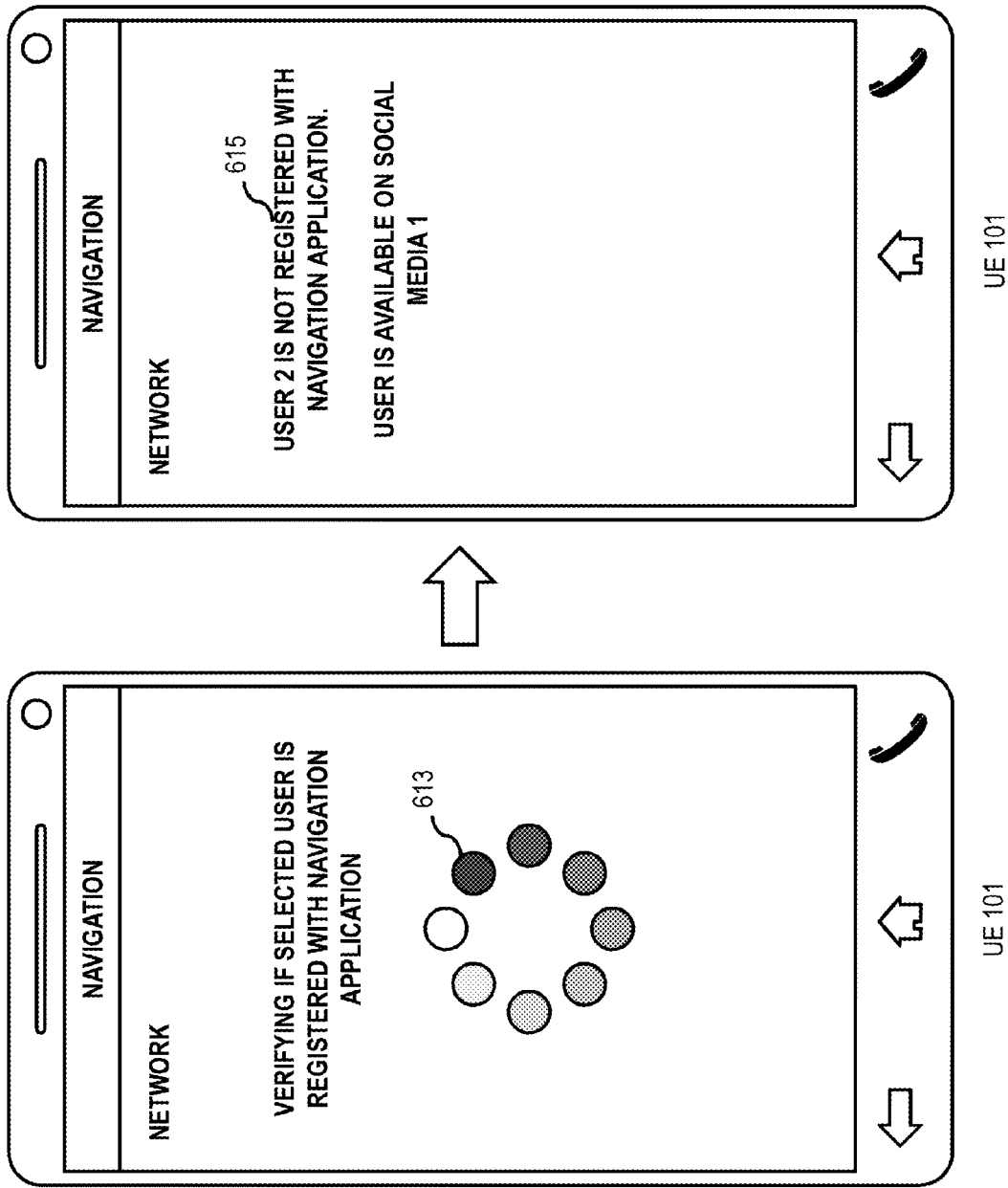

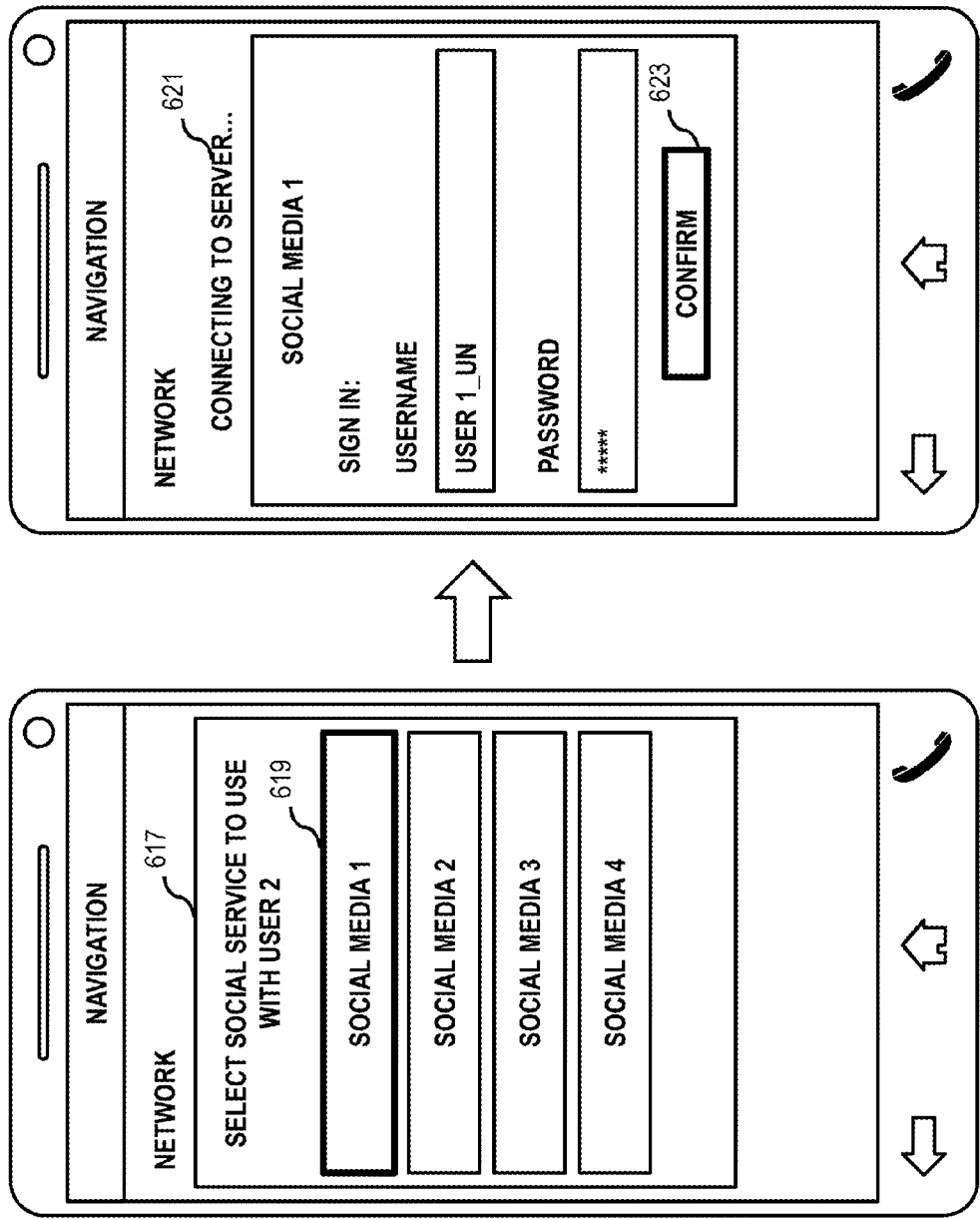

METHOD AND APPARATUS FOR PROVIDING SHARING OF NAVIGATION ROUTE AND GUIDANCE INFORMATION AMONG DEVICES

BACKGROUND

Presently, routing information may be transmitted from an originating mobile device to a recipient mobile device through various communication channels. However, the compatibility of the navigation application between the originating mobile device and the recipient mobile device determines the accessibility of the transmitted routing information. Further, a multitude of navigation applications make use of the different formats during the transmission of the routing information, and as a result, service providers face significant technical challenges in sharing routing information with a recipient mobile device without a navigation application or with an incompatible navigation application.

Some Example Embodiments

Therefore, there is a need for an approach for causing a transmission of routing information to the at least one recipient device without a navigation application using one or more networking services.

According to one embodiment, a method comprises processing and/or facilitating a processing of at least one request to share navigation routing information from at least one first device to at least one second device. The method also comprises determining that at least one application associated with the navigation routing information is not installed on the at least one second device. The method further comprises causing, at least in part, a querying for at least one communication account associated with the at least one second device. The method also comprises causing, at least in part, a transmission of at least one capture of the navigation routing information to the at least one second device using that least one communication account.

According to another embodiment, an apparatus comprises at least one processor, and at least one memory including computer program code for one or more computer programs, the at least one memory and the computer program code configured to, with the at least one processor, cause, at least in part, the apparatus to process and/or facilitate a processing of at least one request to share navigation routing information from at least one first device to at least one second device. The apparatus is also caused to determine that at least one application associated with the navigation routing information is not installed on the at least one second device. The apparatus is further caused to cause, at least in part, a querying for at least one communication account associated with the at least one second device. The apparatus is also caused to cause, at least in part, a transmission of at least one capture of the navigation routing information to the at least one second device using that least one communication account.

According to another embodiment, a computer-readable storage medium carries one or more sequences of one or more instructions which, when executed by one or more processors, cause, at least in part, an apparatus to process and/or facilitate a processing of at least one request to share navigation routing information from at least one first device to at least one second device. The apparatus is also caused to determine that at least one application associated with the navigation routing information is not installed on the at least one second device. The apparatus is further caused to cause, at least in part, a querying for at least one communication account associated with the at least one second device. The apparatus is also caused to cause, at least in part, a transmission of at least one capture of the navigation routing information to the at least one second device using that least one communication account.

According to another embodiment, an apparatus comprises means for processing and/or facilitating a processing of at least one request to share navigation routing information from at least one first device to at least one second device. The apparatus also comprises means for determining that at least one application associated with the navigation routing information is not installed on the at least one second device. The apparatus further comprises means for causing, at least in part, a querying for at least one communication account associated with the at least one second device. The apparatus also comprises means for causing, at least in part, a transmission of at least one capture of the navigation routing information to the at least one second device using that least one communication account.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims 1-10, 21-30, and 46-48.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 6A-6F are user interface diagrams that represent a scenario wherein at least one UE 101 is sharing routing information with at least one other UE 101 without a navigation application, according to one example embodiment;

DESCRIPTION OF SOME EMBODIMENTS

Examples of a method, apparatus, and computer program for causing a transmission of routing information to the at least one recipient device without a navigation application using one or more networking services are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
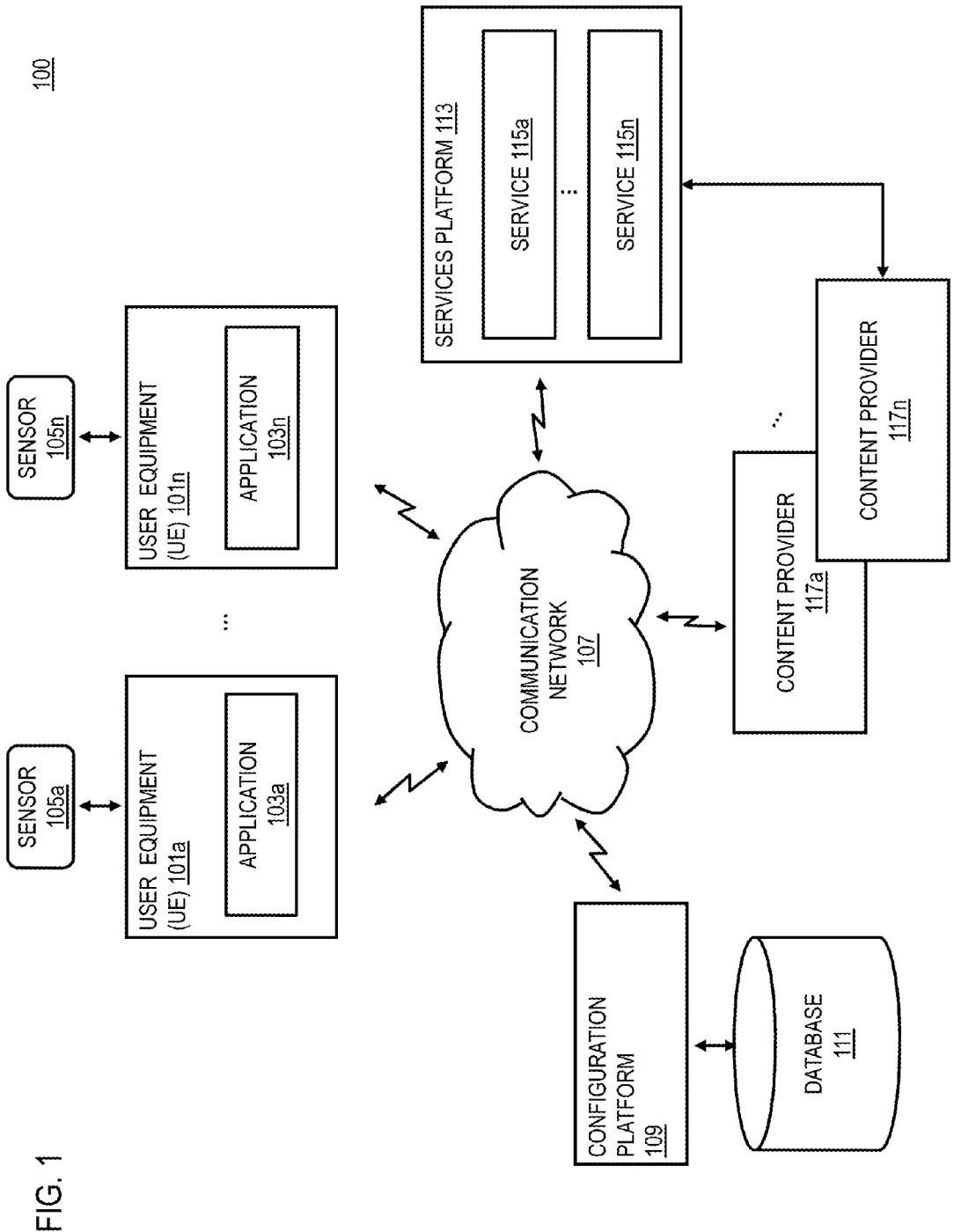
FIG. 1 is a diagram of a system capable of causing a transmission of routing information to the at least one recipient device without a navigation application using one or more networking services, according to one embodiment.

FIG. 1 is a diagram of a system capable of causing a transmission of routing information to the at least one recipient device without a navigation application using one or more networking services, according to one embodiment. At present, service providers face significant technical challenges in sharing routing information with a second device that does not have a navigation application. The current navigation applications and/or services use different formats in providing the information, thus making the sharing of such information incompatible between devices that uses different navigation applications. Hence, users are facing difficulties in sharing the destination and routes, with waypoints, etc. between devices with different applications. Therefore, there is a need for a service that allows a first device with navigation service to share route and navigation guidance to a second device without navigation application, using a network based services or a local process which allows sharing of second device's location information to the first user.

To address this problem, a system 100 of FIG. 1 introduces the capability to share navigation route with another device without a navigation application. In one scenario, a user searches for a destination and selects an option of sharing route information to a destination with another user. On selecting the option, the navigation application of the UE 101 may contact the configuration platform 109 to check whether similar navigation application is installed on the recipient UE 101. If the configuration platform 109 determines that a navigation application is not registered for the recipient UE 101, the configuration platform 109 may search the social network for any registration of the recipient UE 101. The configuration platform 109 upon determination of the registration information for the recipient UE 101 may present a list of networking services on which second user is available to the transmitting UE 101. The configuration platform 109 may allow the transmitting UE 101 to sign-in to a particular networking service. The location information for the recipient UE 101 may be requested via the networking service and may be transmitted to the configuration platform 109, subsequently the configuration platform 109 may share the location information with the recipient UE 101. In another scenario, as the user of the transmitting UE 101 starts navigation towards a particular destination, the navigation application may record screenshots of each maneuver and may share the recording with the recipient UE 101 via networking services. As a result, the transmitting UE 101 may share the route information with the recipient UE 101 without a navigation application via one or more networking services. Since, the navigation guidance is sent over the networking services, the recipient UE 101 does not need to install any special software to be able to access the navigation route.

The configuration platform 109 records the maneuvers of the transmitting UE 101, then detects the location of the recipient UE 101, and provides navigation guidance over the social network service, thereby allowing users to share routing information in real time. In one scenario, the first user may share the information of his/her current location, current and next maneuver to the configuration platform 109. The information may be provided as a picture, for example, as a screenshot of the navigation application. Then, the at least one second user is automatically presented with pictures when the second user needs navigation guidance to the at least one destination. The second user receives the information and the pictures of the maneuver when he/she approaches that location. Further, this approach allows the one or more drivers to follow the driver distraction guidelines, for example, certain navigation services are not considered safe for driving, but a chat comprising of screenshots of the routing information conforms to the regulations.

By way of example, the UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.). In one embodiment, the one or more vehicles may have cellular or WiFi connection either through the inbuilt communication equipment or from the UE 101 associated with the vehicles. The applications 103 may assist in conveying sensor information via the communication network 107.

By way of example, the applications 103 may be any type of application that is executable at the UE 101, such as location-based service applications, navigation applications, mapping application, content provisioning services, camera/imaging application, media player applications, social networking applications, calendar applications, and the like. In one embodiment, one of the applications 103 at the UE 101 may act as a client for the configuration platform 109 and may perform one or more functions associated with the functions of the configuration platform 109 by interacting with the configuration platform 109 over the communication network 107.

By way of example, the sensors 105 may be any type of sensor. In certain embodiments, the sensors 105 may include, for example, a global positioning sensor for gathering location data (e.g., GPS), a network detection sensor for detecting wireless signals or receivers for different short-range communications (e.g., Bluetooth, WiFi, Li-Fi, near field communication etc.), temporal information, a camera/imaging sensor for gathering image data, an audio recorder for gathering audio data, and the like. In one scenario, the sensors 105 may include, light sensors, oriental sensors augmented with height sensor and acceleration sensor, tilt sensors, moisture sensors, pressure sensors, audio sensors (e.g., microphone) etc. It is contemplated that the sensors 105 includes one or more components for selecting and/or prioritizing one or more sensor data based on their attributes.

The communication network 107 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

In one embodiment, the configuration platform 109 may be a platform with multiple interconnected components. The configuration platform 109 may include multiple servers, intelligent networking devices, computing devices, components and corresponding software for sharing of navigation route and guidance with other devices that does not have navigation application, via network services. In another embodiment, the configuration platform 109 allows both recording of on-going navigation and sharing of each maneuver with one or more second device that is following the first device or planning a similar route. The configuration platform 109 may cause checking of one or more second device for availability of navigation application. Then, the configuration platform 109 may cause sharing of the navigation route with a second user's networking service upon determination that the second device is not registered with a navigation application.

In one embodiment, the configuration platform 109 may take screenshot of every maneuver from the navigation application of the at least one first device and may correlate such information with the location. In one scenario, the configuration platform 109 may share the screenshots and the location information via one or more networking services to the at least one second device upon determination of the location information of the at least one second device. The second device does not need any navigation application, the only thing the user of the second device needs to do is to allow sharing of the location information and register the second device with at least one networking service. In another scenario, the configuration platform 109 may present the one or more screenshots to the at least one second user as a part of a private chat, for example, two or more users may share a pre-set route during an active navigation as a part of a trip planning and sharing. The second user may receive a picture of the navigation guidance when approaching the next maneuver.

In one embodiment, the configuration platform 109 may connect the navigation application of the first device with the networking services of the second device, thereby allowing the server to exchange location information through networking services. In one scenario, since there are no maps and limitations of street geometry in an off-road navigation, there is a need to indicate the direction and next maneuvers. The configuration platform 109 by sharing the picture of the one or more maneuvers recorded at the location makes off-road navigation efficient. Further, such solutions may result in off-road track creations.

As discussed, the UE 101 may utilize location-based technologies (sensors, GPS receivers, etc.) to determine location and temporal information regarding the UE 101 associated with the at least one vehicle. For example, the UE 101 may use one or more sensors to obtain information on the orientations, location information, or a combination thereof on the one or more vehicles. In one embodiment, the configuration platform 109 may create the database 111 wherein the determined information, for example, orientation information and/or location information may be stored. In another embodiment, the configuration platform 109 may receive content information from various sources, for example, at least one transmitting device, at least one recipient device, third-party content providers, various databases, etc. and may store the received information on the database 111. The database 111 may include identifiers to the UE 101s as well as the associated information. Further, the information may be any multiple types of information that can provide means for aiding in the content provisioning and sharing process.

The services platform 113 may include any type of service. By way of example, the services platform 113 may include mapping services, location based services, navigation services, travel planning services, social networking services, content (e.g., audio, video, images, etc.) provisioning services, application services, storage services, contextual information determination services, information (e.g., weather, news, etc.) based services, etc. In one embodiment, the services platform 113 may interact with the UE 101, the configuration platform 109 and the content providers 117 to supplement or aid in the processing of the routing information.

By way of example, the services 115 may be an online service that reflects interests and/or activities of users. In one scenario, the services 115 provide representations of each user (e.g., a profile), his/her social links, and a variety of additional information. The services 115 allow users to share location information, activities information, contextual information, historical user information and interests within their individual networks, and provides for data portability. The services 115 may additionally assist in providing the configuration platform 109 with routing information for the one or more vehicles to the at least one destination.

The content providers 117 may provide content to the UE 101, the configuration platform 109, and the services 115 of the services platform 113. The content provided may be any type of content, such as textual content, audio content, video content, image content, etc. In one embodiment, the content providers 117 may provide content that may supplement content of the applications 103, the sensors 105, or a combination thereof. By way of example, the content providers 117 may provide content that may aid in determining the transmission of routing information to the at least one recipient device without a navigation application using one or more networking services. In one embodiment, the content providers 117 may also store content associated with the UE 101, the configuration platform 109, and the services 115 of the services platform 113. In another embodiment, the content providers 117 may manage access to a central repository of data, and offer a consistent, standard interface to data, such as a repository of users' navigational data content.

By way of example, the UE 101, the configuration platform 109, the services platform 113, and the content providers 117 communicate with each other and other components of the communication network 107 using well known, new or still developing protocols. In this context, a protocol includes a set of rules defining how the network nodes within the communication network 107 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
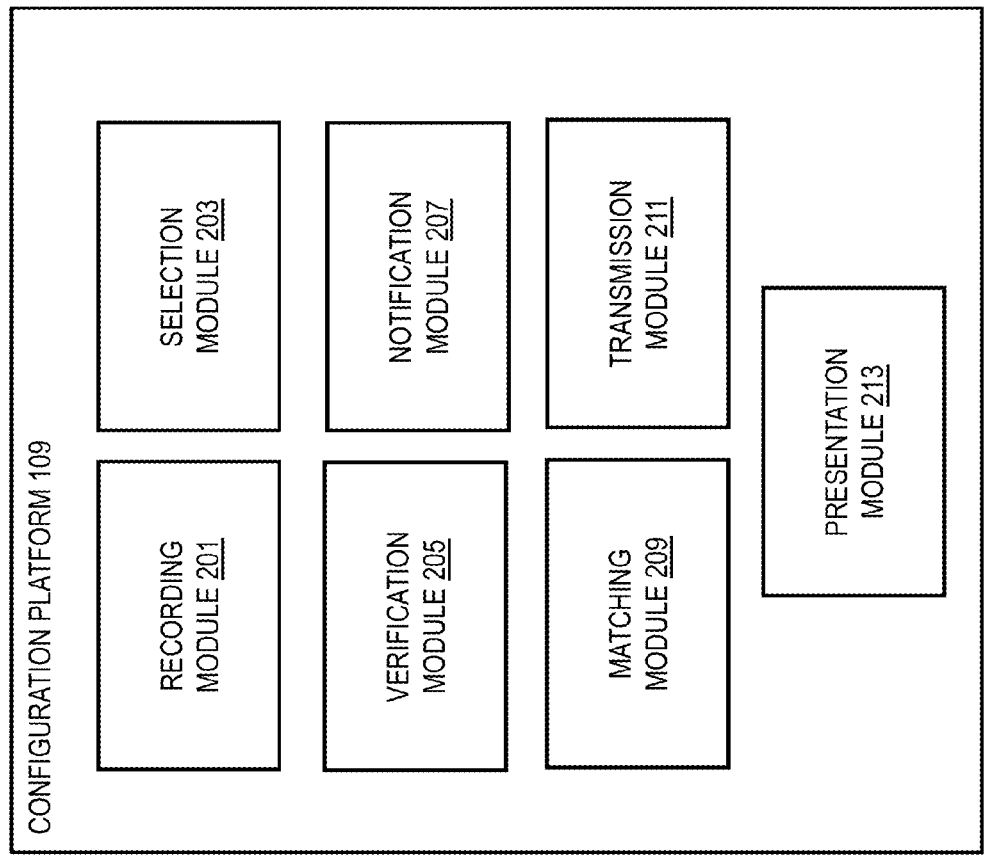
FIG. 2 is a diagram of the components of the configuration platform 109, according to one embodiment.

FIG. 2 is a diagram of the components of the configuration platform 109, according to one embodiment. By way of example, the configuration platform 109 includes one or more components for causing a transmission of routing information to the at least one recipient device without a navigation application using one or more networking services. It is contemplated that the functions of these components may be combined in one or more components or performed by other components of equivalent functionality. In this embodiment, the configuration platform 109 includes a recording module 201, a selection module 203, a verification module 205, a notification module 207, a matching module 209, a transmission module 211 and a presentation module 213.

In one embodiment, the recording module 201 may cause, at least in part, a recording of at least one routing information by the at least one device. In one scenario, the one or more sensors 105 may detect the maneuver for at least one vehicle and/or any other type of traveler (biker, etc.). Subsequently, the recording module may record the routing information for the at least one vehicle and/or any other type of traveler (biker, etc.) that is travelling to the at least one destination. In another embodiment, the recording module 201 may cause, at least in part, a recording of at least one routing information, at least one screenshot, or a combination thereof upon completion of the at least one travel to the at least one destination.

In one embodiment, the selection module 203 may cause, at least in part, a selection of the at least one second device to share the routing information by the at least one device, the at least one server, or a combination thereof based, at least in part, on the verification of registration information with at least one navigation service, the at least one networking service, or a combination thereof. In another embodiment, the selection module 203 may cause, at least in part, a selection of the at least one networking service to convey the routing information to the at least one second device based, at least in part, on a determination that the at least one second device is not registered with a navigation service. In a further embodiment, the selection module 203 may cause, at least in part, a selection of routing information based, at least in part, on the matching of location information between the at least one device and the at least one second device, temporal information of the at least one second device, or a combination thereof.

In one embodiment, the verification module 205 may cause, at least in part, a verification of registration information for the at least one second device for the at least one navigation service, the at least one networking service, or a combination thereof. In one scenario, the verification module 205 may determine whether the at least one second device is equipped with navigation services. The verification module 205 may further determine whether the navigation services at the at least one second device is compatible to access the transmitted routing information. In another embodiment, the verification module 205 may determine whether the at least one second device is registered with the at least one social networking service.

In one embodiment, the notification module 207 may cause, at least in part, a notification of at least one request for location information to the at least one second device by the at least one device, the at least one server, or a combination thereof. In one embodiment, the at least one notification may be in an image format, a message format, a video format, an audio format, or a combination thereof.

In one embodiment, the matching module 209 causes, at least in part, a matching of location information between the at least one device and the at least one second device. In one scenario, such comparison of location information by the matching module 209 between the sender UE 101 and the recipient UE 101 enables the selection module 203 to select at least one relevant routing information for the at least one recipient UE 101 for providing at least one navigation guidance.

In one embodiment, the transmission module 211 causes, at least in part, a transmission of the location information to the at least device, the at least one server based, at least in part, on the acceptance of the at least one request by the at least one second device. In another embodiment, the transmission module 211 causes, at least in part, a transmission of at least one recording from the at least one server to the at least one second device based, at least in part, on the location information.

In one embodiment, the presentation module 213 may cause a presentation of routing information upon receiving relevant navigation data from the other modules. This module obtains a set of summary statistics from the other modules, and may continue with providing a display of navigation data sets. In one scenario, the summary statistic may include, for example, routing information to the at least one destination, off road navigation information to the at least one destination, location information for the at least one UE 101 requesting routing information and/or the at least one UE 101 within close proximity, etc. In another embodiment, the presentation module 213 may present a textual notification, a pictorial notification or an aural notification on the visual display unit of the at least one other UE 101 requesting for information.

The above presented modules and components of the configuration platform 109 can be implemented in hardware, firmware, software, or a combination thereof. Though depicted as a separate entity in FIG. 1, it is contemplated that the configuration platform 109 may be implemented for direct operation by respective UE 101. As such, the configuration platform 109 may generate direct signal inputs by way of the operating system of the UE 101 for interacting with the applications 103. In another embodiment, one or more of the modules 201-213 may be implemented for operation by respective UEs, as a configuration platform 109. Still further, the configuration platform 109 may be integrated for direct operation with the services 115, such as in the form of a widget or applet, in accordance with an information and/or subscriber sharing arrangement. The various executions presented herein contemplate any and all arrangements and models.

Figure 3:
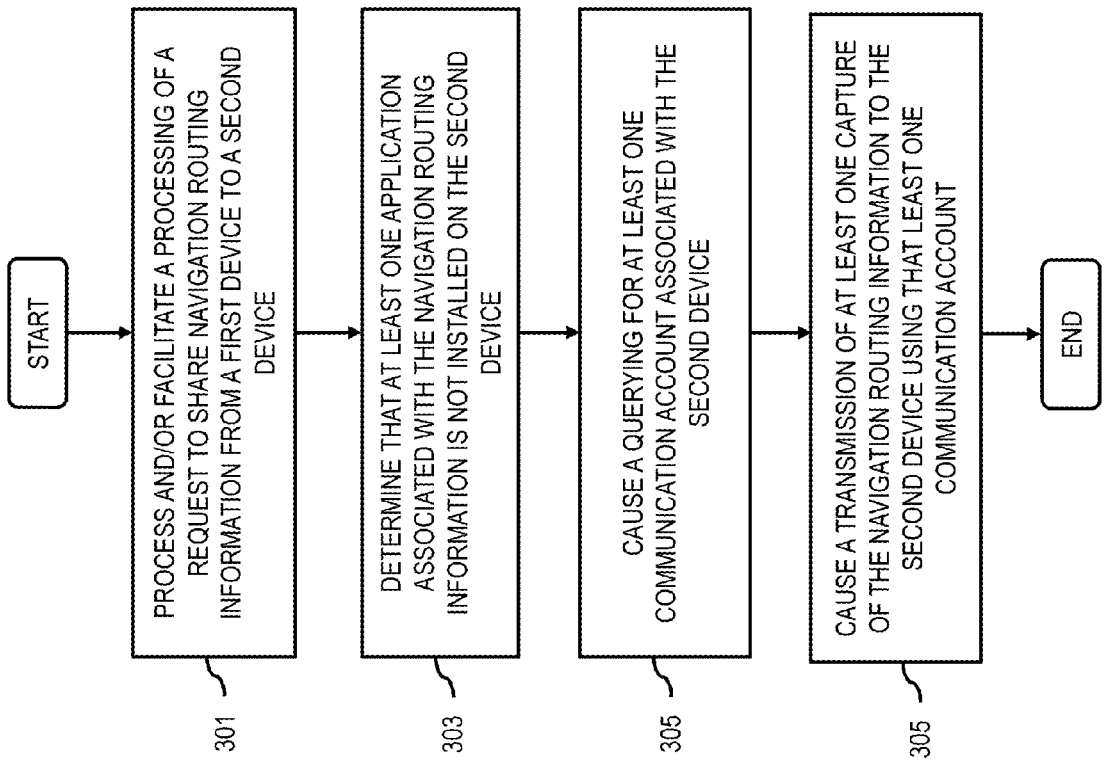
FIG. 3 is a flowchart of a process for causing a transmission of routing information to the at least one recipient device without a navigation application using one or more networking services, according to one embodiment.
Figure 12:
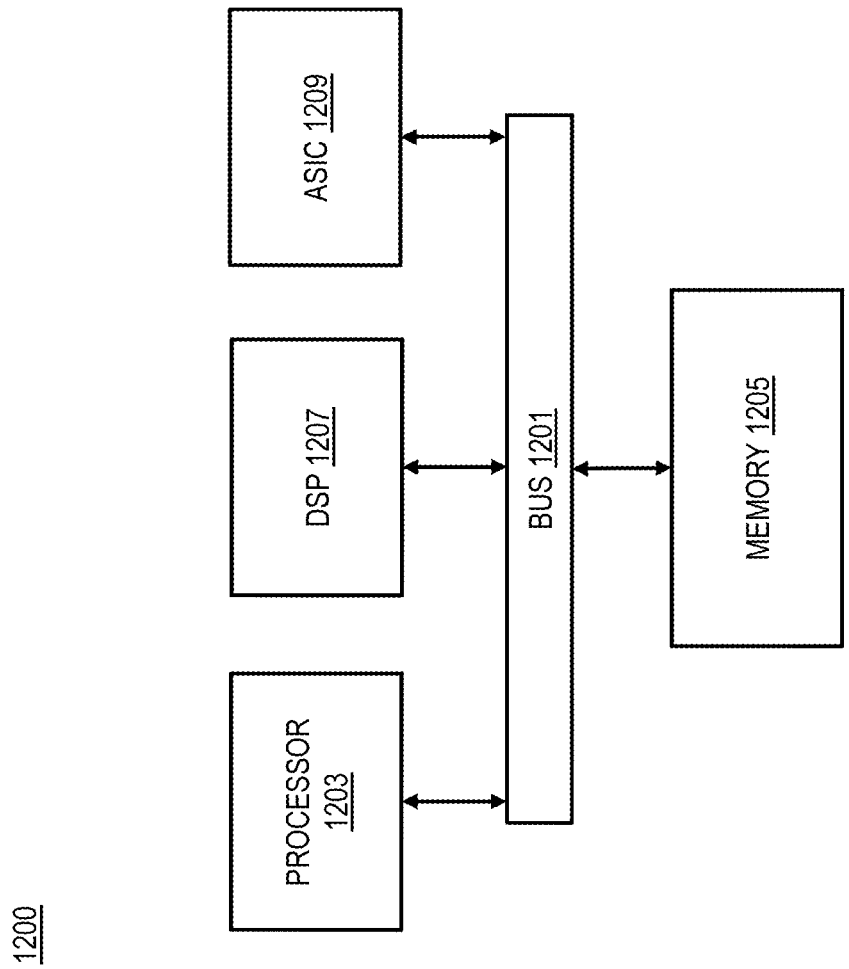
FIG. 12 is a diagram of a chip set that can be used to implement an embodiment of the invention.

FIG. 3 is a flowchart of a process for causing a transmission of routing information to the at least one recipient device without a navigation application using one or more networking services, according to one embodiment. In one embodiment, the configuration platform 109 performs the process 300 and is implemented in, for instance, a chip set including a processor and a memory as shown in FIG. 12.

In step 301, the configuration platform 109 processes and/or facilitates a processing of at least one request to share navigation routing information from at least one first device to at least one second device. In one scenario, the configuration platform 109 may determine one or more geo-routes for at least one vehicle using historical and/or predicted location information, such as the daily work commute traveled by one or more UE 101 associated with the at least one vehicle. The configuration platform 109 may select one or more routing information because the history of geo-routes for the at least one vehicle indicates that they will soon be proximate location (e.g., regardless of whether the UE 101 are already in the location, as the predicted location information suggests that UE 101 may soon be within the vicinity). Further, the configuration platform 109 may determine one or more future locations for at least one vehicle based, at least in part, on the ease of access from a location associated with the UE 101, sensor information, or a combination thereof.

In step 303, the configuration platform 109 determines that at least one application associated with the navigation routing information is not installed on the at least one second device. In one scenario, the at least one first device may provide the configuration platform 109 with one or more pictures of routing information to the at least one destination. The configuration platform 109 may check for the availability of a compatible navigation application in the at least second device. The configuration platform 109 may determine that the at least one second device does not have a compatible navigation application, subsequently the configuration platform 109 may transfer routing information across a networking service to the at least one second device. This enables the one or more users to share navigation information regardless of the feature of their navigation services. Therefore, the one or more users do not have to pay for navigation services.

In step 305, the configuration platform 109 causes, at least in part, a querying for at least one communication account associated with the at least one second device, wherein the at least one communication account includes, at least in part, one or more social networking accounts, one or more messaging accounts, one or more file sharing accounts, or a combination thereof. In one scenario, the configuration platform 109 utilizes the existing social networking services to share navigation images and data. The configuration platform 109 may create screenshot capture of the at least one route to the at least one destination, which may be shared with other users travelling on similar routes to the same destination. In another scenario, the configuration platform 109 may cause a screen capture of the navigation application and may share the actual navigation information with other users in the form of real time chat discussion.

In step 307, the configuration platform 109 causes, at least in part, a transmission of at least one capture of the navigation routing information to the at least one second device using that least one communication account, wherein the at least one capture includes, at least in part, one or more image captures of at least one screen of the at least one first device presenting the navigation routing information. In one embodiment, the navigation routing information is presented in at least one application user interface of the at least one second device in combination with at least one other application user interface associated with at least one other application, and wherein the at least one other application includes, at least in part, at least one navigation application that is not associated with the routing information. In one embodiment, the configuration platform 109 causes, at least in part, a generation of enhanced screenshots of at least one maneuver, at least one route overview, a full maneuver list, or a combination thereof by the at least one first device for providing at least one navigation guidance to the at least one second device. In another embodiment, the configuration platform 109 may relay and/or forward the routing information in at least one image format, at least one message format, at least one video format, at least one audio format, or a combination thereof.

Figure 4:
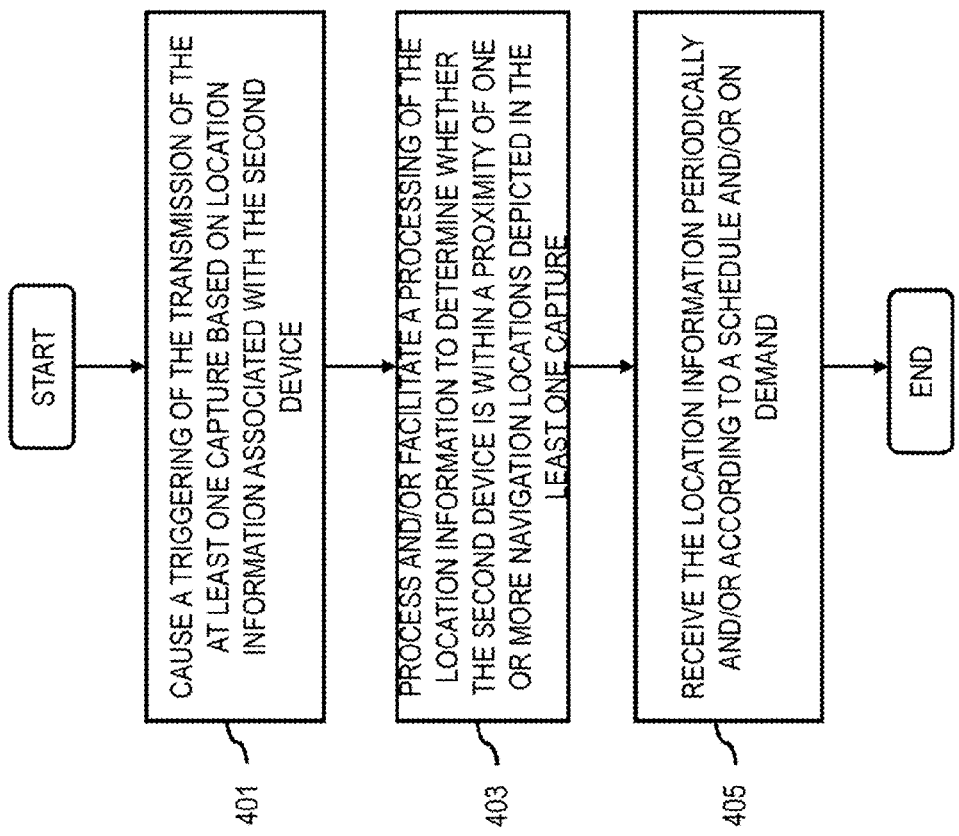
FIG. 4 is a flowchart of a process for processing location information of the at least one second device to cause a triggering of the transmission of the at least one capture, according to one embodiment.

FIG. 4 is a flowchart of a process for processing location information of the at least one second device to cause a triggering of the transmission of the at least one capture, according to one embodiment. In one embodiment, the configuration platform 109 performs the process 400 and is implemented in, for instance, a chip set including a processor and a memory as shown in FIG. 12.

In step 401, the configuration platform 109 causes, at least in part, a triggering of the transmission of the at least one capture based, at least in part, on location information associated with the at least one second device. In one embodiment, the recipient UE 101 may perform one or more steps to trigger a transmission of the at least one capture from the configuration platform 109. In one embodiment, the configuration platform 109 may cause, at least in part, a relaying, a forwarding, or a combination thereof of the at least one routing information to at least one second device based, at least in part, on the location information of the at least one second device. The configuration platform 109 may cause a matching of the location information between the at least one first device and the at least one second device. Then, the configuration platform 109 may cause a selection of the routing information based, at least in part, on the matching. In one embodiment, the configuration platform 109 may provide the at least one second device with routing information based, at least in part, on a determination of a request to receive the at least one routing information over the at least one communication session. In one embodiment, the at least one capture is triggered at the at least one first device based, at least in part, on (a) at least one presentation of one or more navigation instructions, (b) at least one performance of one or more navigation maneuvers, (c) an occurrence of one or more navigation-related events, (d) contextual information associated with the at least one navigation route, or (e) a combination thereof.

In step 403, the configuration platform 109 processes and/or facilitates a processing of the location information to determine whether the at least one second device is within a proximity of one or more navigation locations depicted in the least one capture, wherein the triggering of the transmission of the least one capture is further based, at least in part, on the proximity. In one embodiment, the configuration platform 109 causes a recording of at least one routing information, at least one screenshot, or a combination thereof upon completion of the at least one travel to the at least one destination. Then, the configuration platform 109 causes a transmission of at least one recording to the at least one second device based, at least in part, on the location information.

In step 405, the configuration platform 109 receives the location information periodically, according to a schedule, on demand, or a combination thereof. In one scenario, the configuration platform 109 causes a notification of at least one request for location information to the at least one second device. Then, the configuration platform 109 may cause transmission of the routing information to the at least one second device based, at least in part, on the location information received from the at least one second device.

Figure 5:
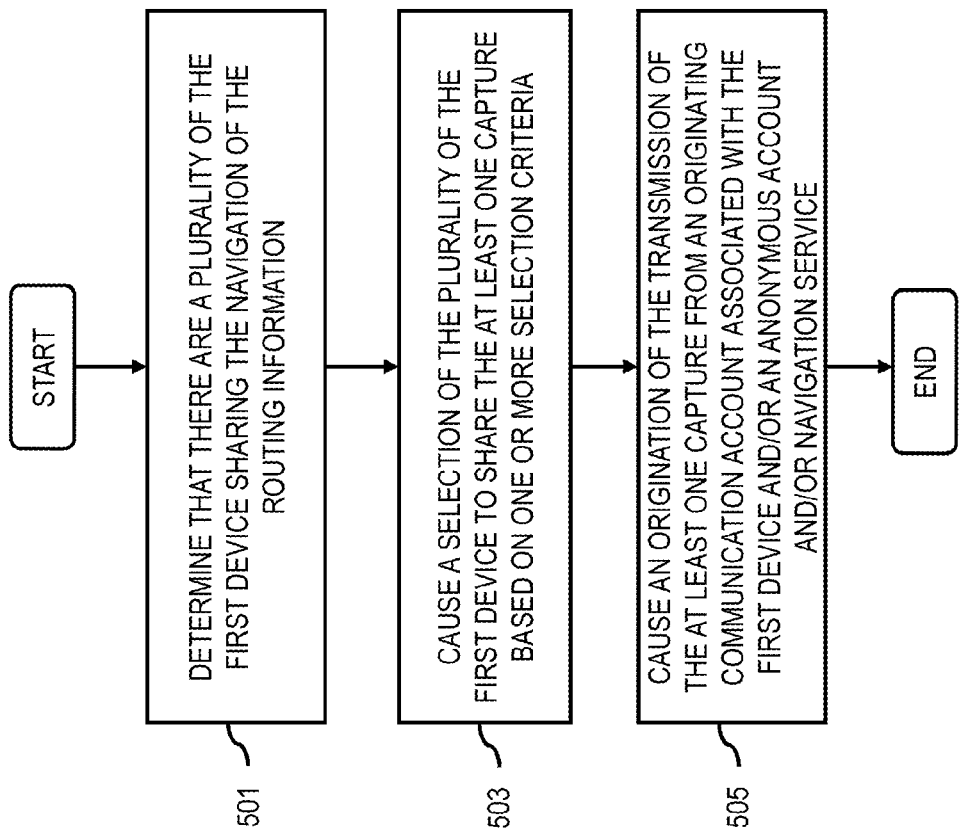
FIG. 5 is a flowchart of a process for selecting at least one first device from the determined plurality of at least one first device to share the at least one capture, according to one embodiment.
Figure 6B:
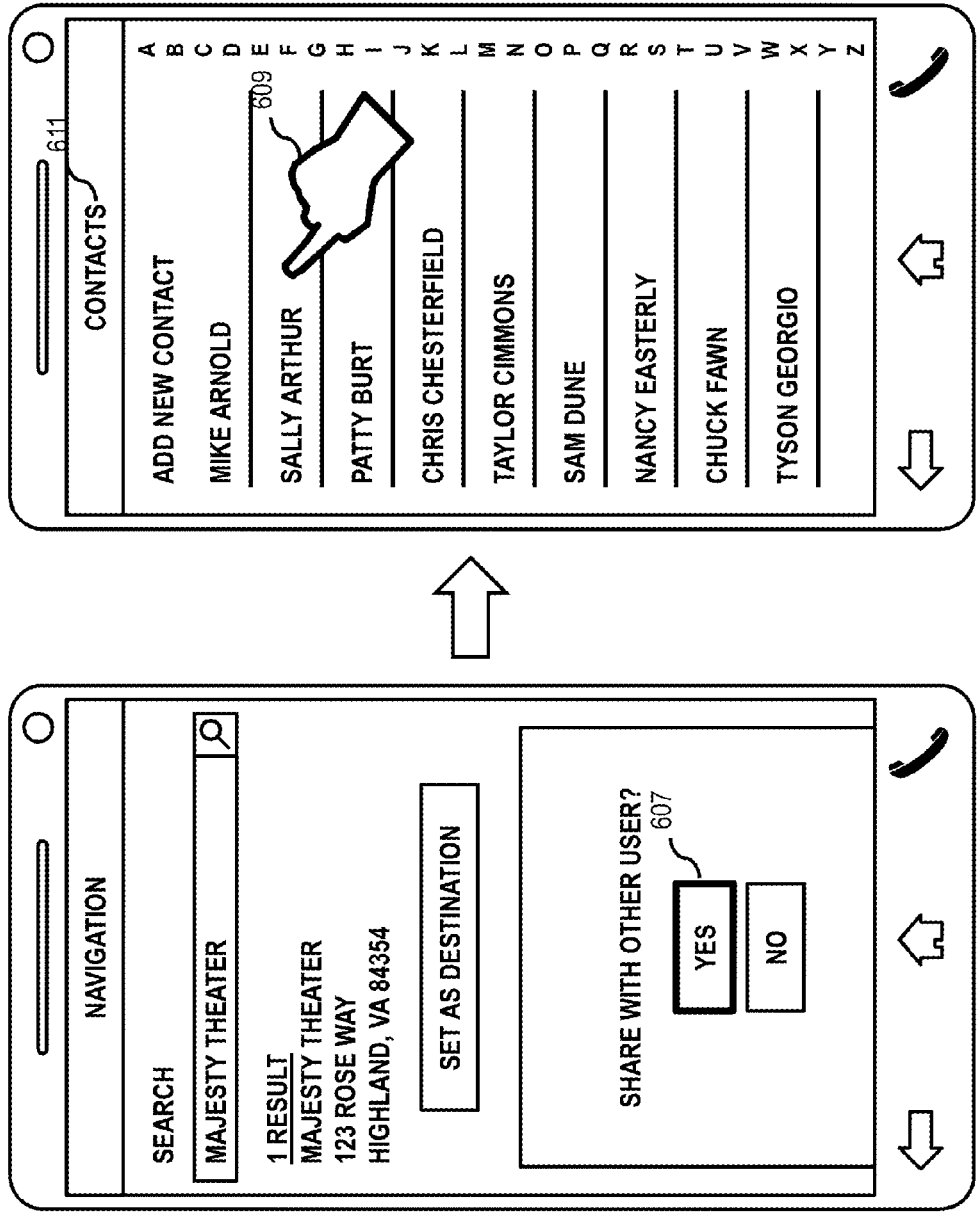
Figure 6E:
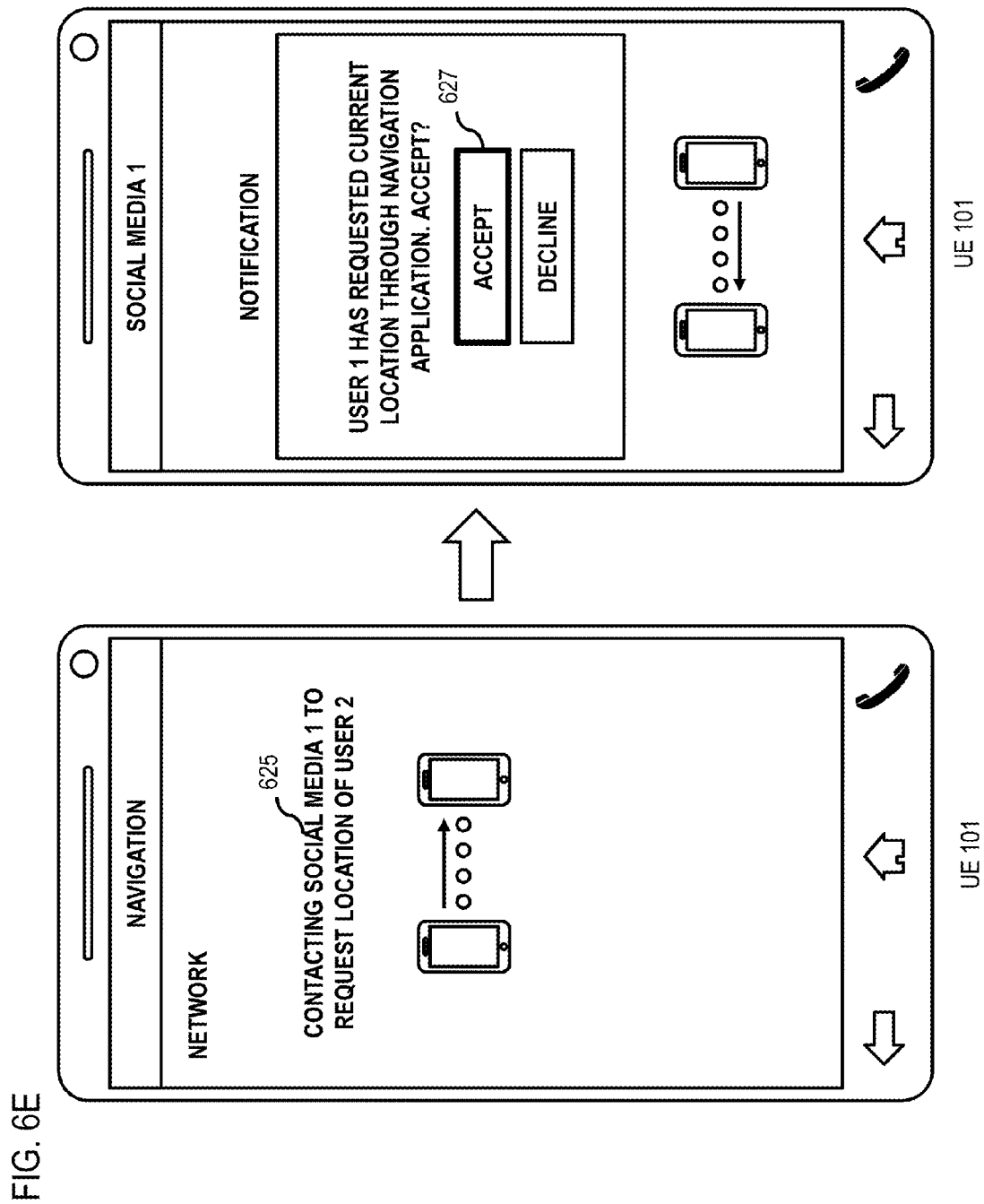
Figure 6F:
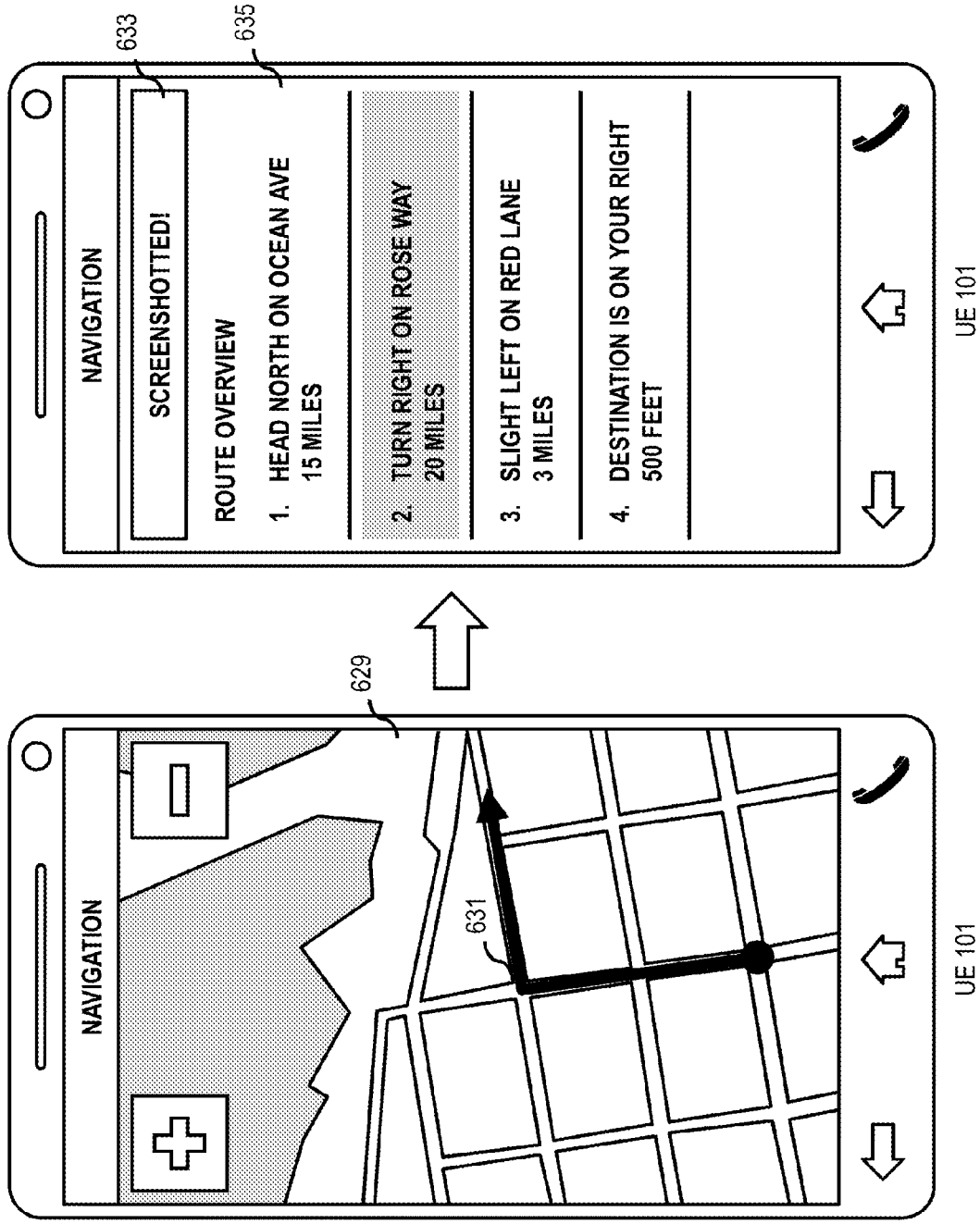

FIG. 5 is a flowchart of a process for selecting at least one first device from the determined plurality of at least one first device to share the at least one capture, according to one embodiment. In one embodiment, the configuration platform 109 performs the process 400 and is implemented in, for instance, a chip set including a processor and a memory as shown in FIG. 12.

In step 501, the configuration platform 109 determines that there are a plurality of the at least one first device sharing the navigation of the routing information. In one embodiment, the configuration platform 109 may process and/or facilitate a processing of one or more transmitting UE 101 to determine complexity information for the at least one route, timing information to the at least one destination, or a combination thereof. Then, the configuration platform 109 may cause a ranking of the one or more transmitting UE 101, thereby causing a selection of at least one transmitting UE 101 for routing information. In one scenario, the selection may be based, at least in part, on the processing, the contextual information of the recipient UE 101, or a combination thereof.

In step 503, the configuration platform 109 causes, at least in part, a selection of the plurality of the at least one first device to share the at least one capture based, at least in part, on one or more selection criteria, wherein the one or more selection criteria include, at least in part, an extent of progress along at least one navigation route, a travel speed, a travel order, or a combination thereof. In one scenario, sharing of the routing information may be based on the one or more maneuvers, for example, the configuration platform 109 may provide a confirmation to the at least one user of the second device travelling on a straight road that he/she is driving in the right direction rather than sending multiple screenshots of the maneuvers. In another scenario, the configuration platform 109 may cause a presentation of one or more screenshots based at least in part on the speed of the second device. The cognitive load for reading pictures can quickly increase as the speed of travel increases. Other factors, such as the number of different fonts, different sizes, different placements, etc. of the screenshots can also present significant strains on the user's cognitive load. To address this issue, the configuration platform 109 may trigger different screenshots when speed of the at least one vehicle changes in a timely and user friendly manner, thereby making picture-based identification less taxing. In a further scenario, the configuration platform 109 may provide a chronological order of the screenshots to the at least one destination based on the travel plan of the at least one user. In one example embodiment, when two or more users are racing off the road to the at least one destination, the configuration platform 109 may provide screenshots of the routes previously travelled by at least one driver, thereby creating a travel path.

In step 505, the configuration platform 109 causes, at least in part, an origination of the transmission of the at least one capture from at least one originating communication account associated with the at least one first device, at least one anonymous account, at least one navigation service, or a combination thereof. In one embodiment, the configuration platform 109 causes, at least in part, a verification of registration information for the at least one second device for the at least one navigation service, the at least one networking service, or a combination thereof. Then, the configuration platform 109 causes, at least in part, a selection of the at least one networking service to convey the routing information to the at least one second device based, at least in part, on a determination that the at least one second device is not registered with a navigation service.

FIGS. 6A-6F are user interface diagrams that represent a scenario wherein at least one UE 101 is sharing routing information with at least one other UE 101 without a navigation application, according to one example embodiment. In one scenario, user A may be searching for direction towards the Majesty Theater [601], whereby user A may be presented with an option to set Majesty Theater as the destination [603]. Then, user A may select Majesty Theater as the destination whereupon user A may be prompted with an option to share the routing information with other users travelling the similar route in the future [605]. The user A may select the option to share the routing information with the other user [607], whereby user A may be presented with another option to select [609] one or more users from the contacts [611]. Subsequently, the configuration platform 109 may verify whether the at least one other UE 101 is registered for a similar navigation application. The configuration platform 109 may respond to the UE 101 of user A that the at least one other UE 101 is not registered with similar navigation application, but can be accessed through social networking services [613, 615]. Consequently, user A may be presented with a list of social networking services through which the at least one other UE 101 may be accessed. The user A may select at least one social networking service to send one or more routing information to the at least one other UE 101 [617, 619]. Then, the configuration platform 109 may establish an online connection to the social networking services [621] and may sign in as user A [623]. In one scenario, the configuration platform 109 may request for location information of the at least one other UE 101 as per the request of the user A [625], whereupon at least one other UE 101 is notified of the request for the location information. The at least one other UE 101 may accept user A's request for location information, then the location information of the at least one other UE 101 may be transmitted via the social networking service to the UE 101 of user A [627]. The configuration platform 109 may provide the at least one other UE 101 with routing information to navigate to the at least one destination previously travelled by user A [629]. In one scenario, the at least one navigation application associated with user A's UE 101 may take screenshots of at least one maneuver, a full maneuver list, at least one route overview [631], or a combination thereof for providing navigation guidance to the at least one other user. In another scenario, as a maneuver is made by user A to the at least one destination, the configuration platform 109 may transmit a screenshot from the user A's UE 101 to the at least one other UE 101 [633, 635].

Figure 7:
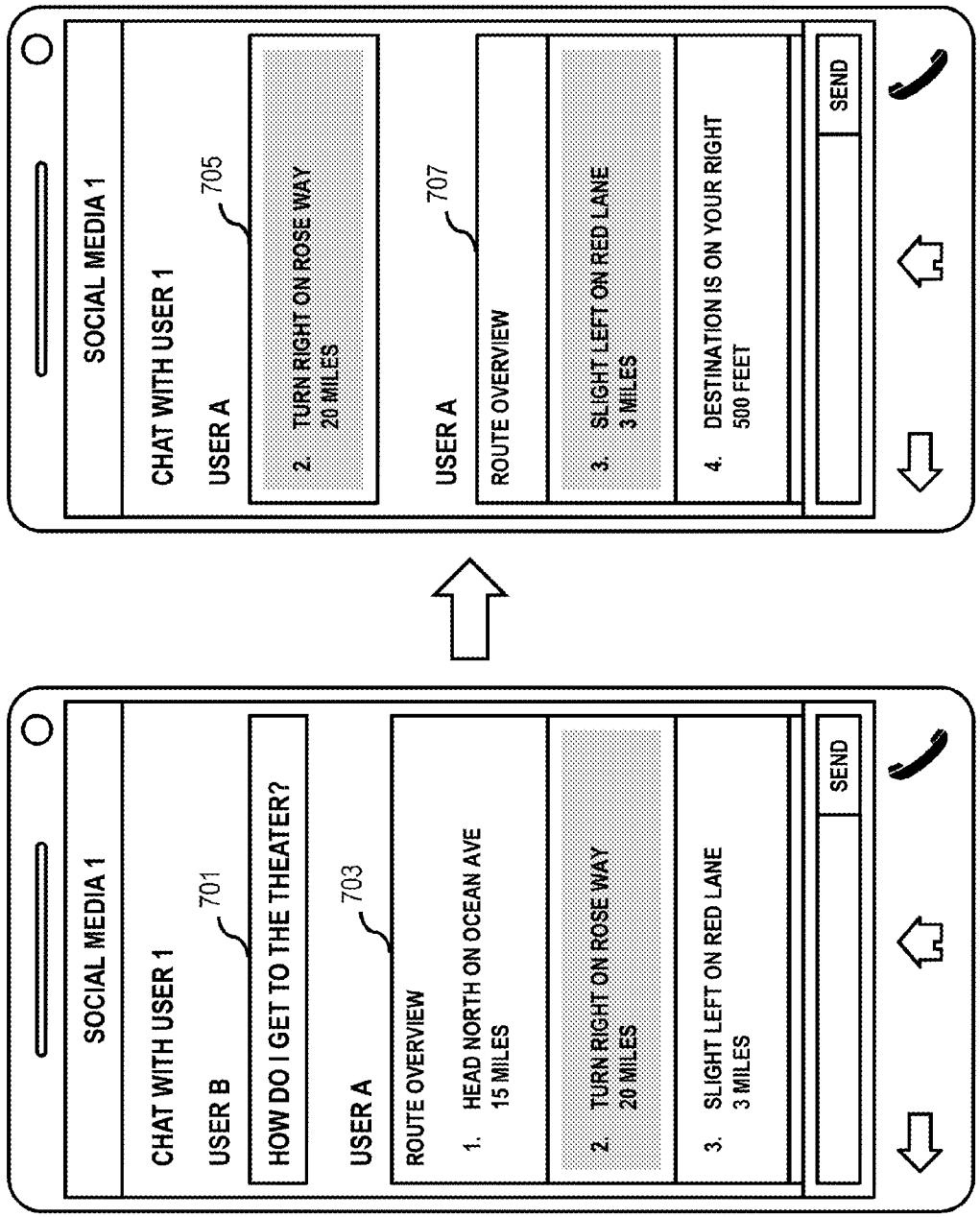
FIG. 7 is a user interface diagram that represents a scenario wherein routing information is shared in a social networking service application view, according to one example embodiment.

FIG. 7 is a user interface diagram that represents a scenario wherein routing information is shared in a social networking service application view, according to one example embodiment. In one scenario, the configuration platform 109 may determine location information for user B and may transmit screenshots to the at least one UE 101 associated with user B. The screenshots may be associated with the location information of user B, and may be presented in the social networking service application view, for example, in a real time chat format [701, 703]. In another scenario, as user B is approaching the next maneuver, the configuration platform 109 may transmit associated screenshots as a navigation guidance to user B [705, 707].

Figure 8:
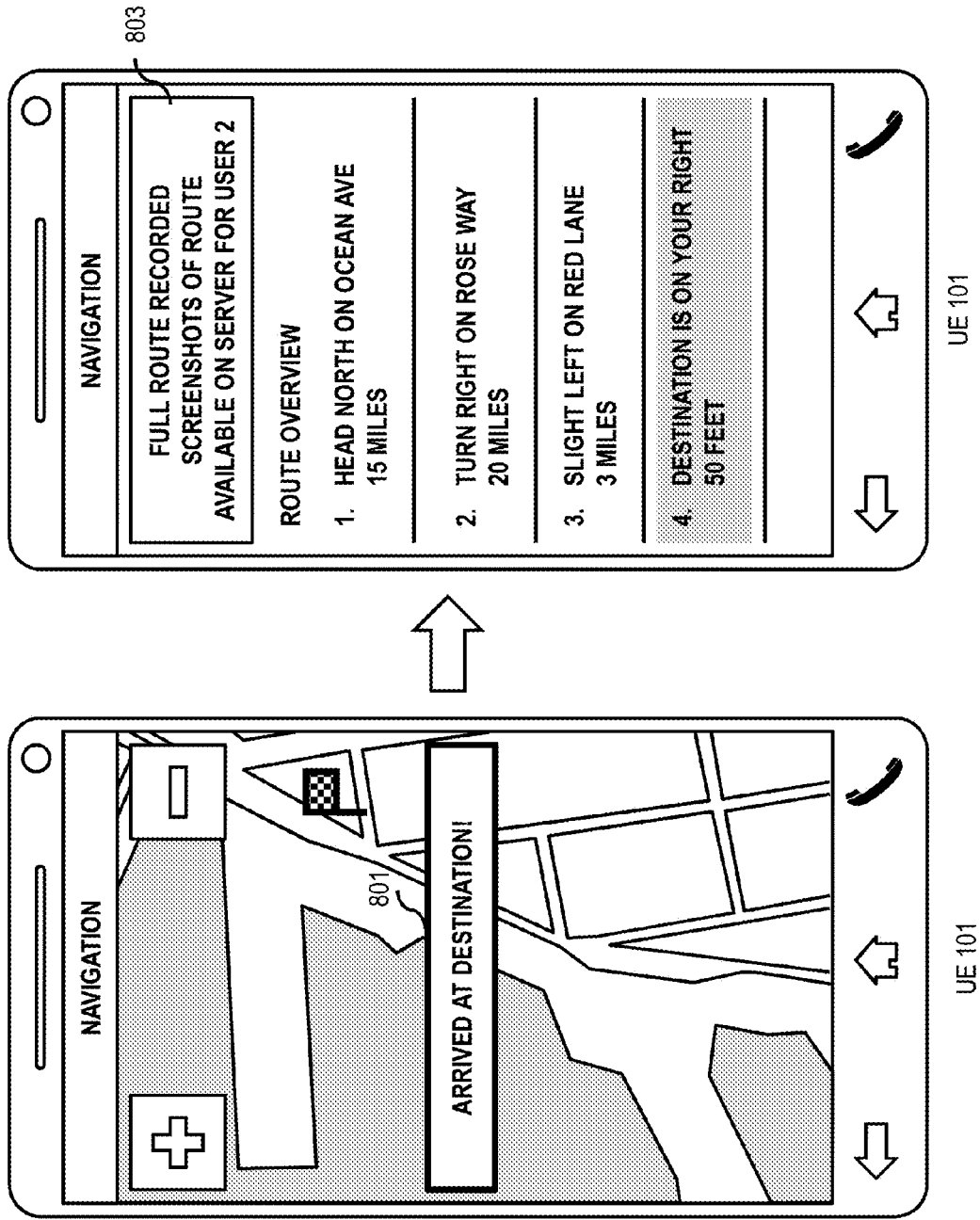
FIG. 8 is a user interface diagram that represents a scenario wherein a full route to the at least one destination is recorded upon determination that the at least one user has completed the travel, according to one example embodiment.

FIG. 8 is a user interface diagram that represents a scenario wherein a full route to the at least one destination is recorded upon determination that the at least one user has completed the travel, according to one example embodiment. In one scenario, user A may reach his/her destination, whereupon the configuration platform 109 may record the complete routing information towards the at least one destination [801]. The configuration platform 109 may make available the one or more screenshots [803] of the routes to the at least one other users, thereby allowing the at least one other users to follow the navigation route by using the screenshots at any time. In this manner, the sender UE 101 may share the routing information with receiving UE 101 without any navigation application. This approach makes optimal utilization of one or more social networking services, one or more location information, or a combination thereof. Since, the navigation guidance is transmitted via one or more social networking services, the receiving UE 101 does not need to install any special software to be able to access the navigation route.

Figure 9:
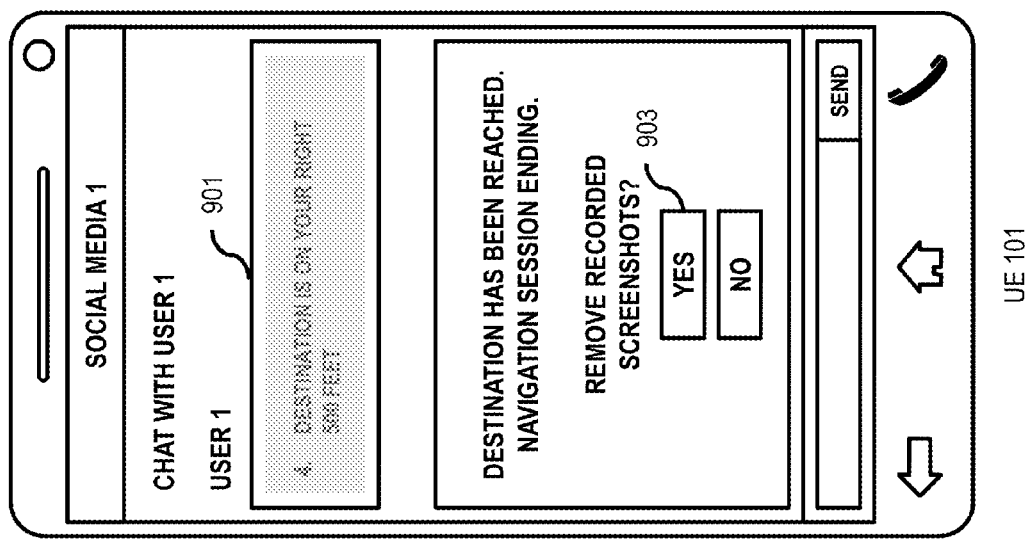
FIG. 9 is a user interface diagram that represents a scenario wherein at least one user is presented with an option to remove the navigation information upon reaching the at least one destination, according to one example embodiment.

FIG. 9 is a user interface diagram that represents a scenario wherein at least one user is presented with an option to remove the navigation information upon reaching the at least one destination, according to one example embodiment. In one scenario, user B may be travelling to the at least one destination following the routing information provided by UE 101 associated with user A. As user B reaches the at least one destination the session is ended [901] and the recorded screenshots may be removed, unless otherwise requested by user [903].

Figure 10:
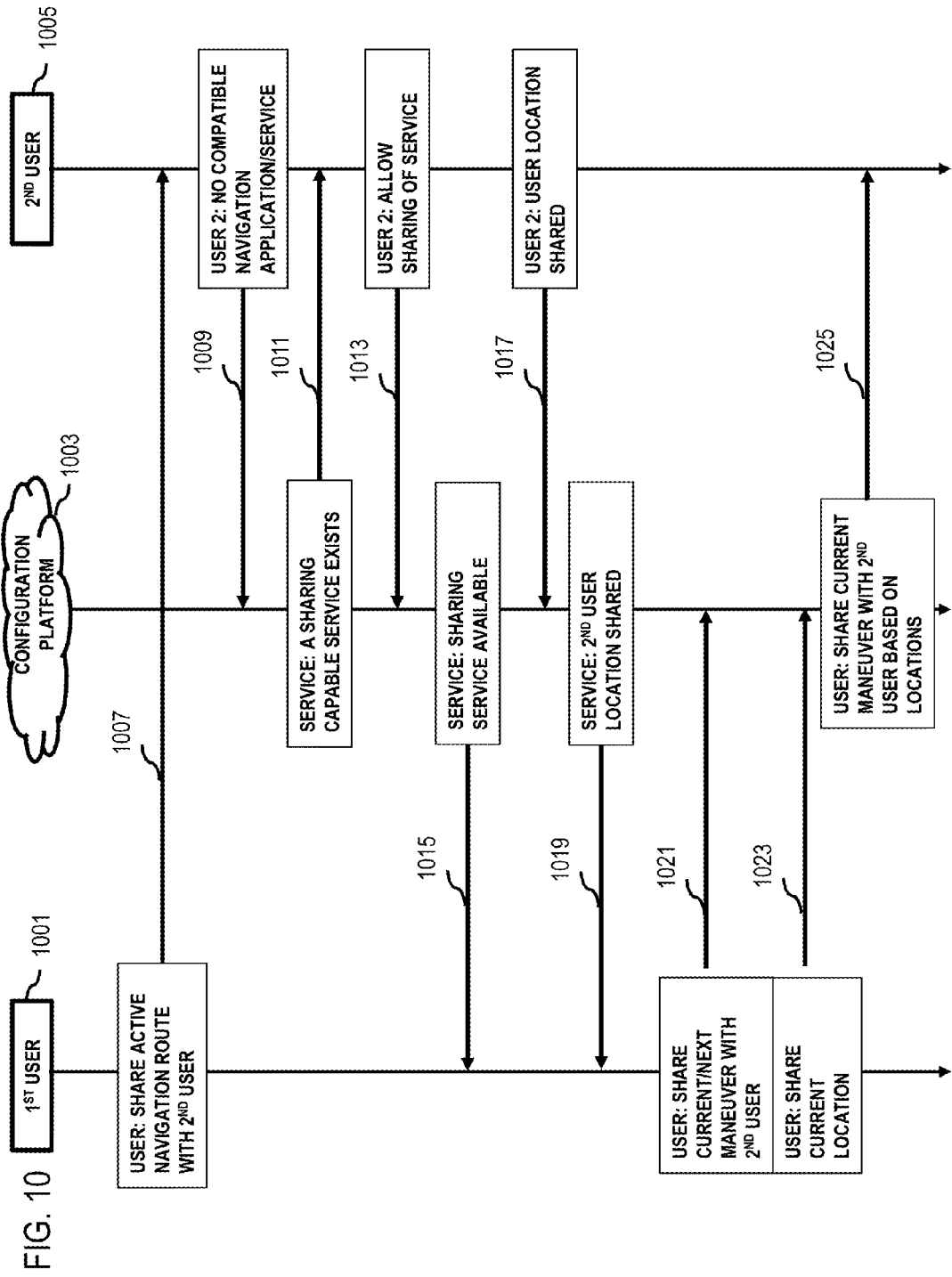
FIG. 10 is a ladder diagram utilized in the process of sharing navigation route and guidance with another UE 101 without a navigation application or services, according to one example embodiment.

FIG. 10 is a ladder diagram utilized in the process of sharing navigation route and guidance with another UE 101 without a navigation application or services, according to one example embodiment. In step 1007, the at least one first user [1001] may agree to share active navigation routing information with the at least one other user [1005] via configuration platform [1003]. Subsequently, the configuration platform [1003] may determine the compatibility of the navigation application in the at least one UE 101 of the second user [1005] with the navigation application of the at least one UE 101 of the first user [1001]. In step 1009, the configuration platform [1003] may determine that the at least one UE 101 associated with the second user [1005] does not have a navigation application, or the navigation application is not compatible with the UE 101 of the first user [1001]. In step 1011, the configuration platform [1003] may determine whether the UE 101 associated with the second user [1005] has the capacity of accessing the shared information via social networking services. The configuration platform [1003] upon determining that the at least one UE 101 associated with the second user [1005] has social networking services through which the UE 101 may access the routing information. In step 1013, the at least one UE 101 of the second user [1005] may send capability information to the configuration platform [1003] that it can access routing information via one or more social networking services. In step 1015, the configuration platform [1003] may notify the first user [1001] that the at least one UE 101 of the second user [1005] has the capability to access the shared routing information. In step 1017, the at least one UE 101 of the second user [1005] may provide the configuration platform [1003] with location information. In step 1019, the configuration platform [1003] may share the location information of the second user with the UE 101 associated with the first user [1001]. In one scenario, the configuration platform [1003] may evaluate the location information of the second user to transmit relevant routing information. In step 1021, the UE 101 of the first user may share routing information with the configuration platform [1003]. In one scenario, the UE 101 of the first user may share real time routing information, wherein the configuration platform [1003] may be provided with current maneuver of the at first user. In step 1023, the UE 101 associated with the first user may provide the configuration platform [1003] with current location information. The configuration platform [1003] may use the current location information of the first user to provide real time navigation guidance to the second user driving on a similar route to the at least one destination shortly after the first user. In step 1025, the configuration platform [1003] may provide the second user with routing information based, at least in part, on the location information. In one scenario, the configuration platform [1003] may share the current maneuver with the second user based on the location of the UE 101 associated with the second user, for example, the configuration platform [1003] may provide screenshots to the second user, instructing the second user to turn right after 10 feet.

The processes described herein for causing a transmission of routing information to the at least one recipient device without a navigation application using one or more networking services may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 11:
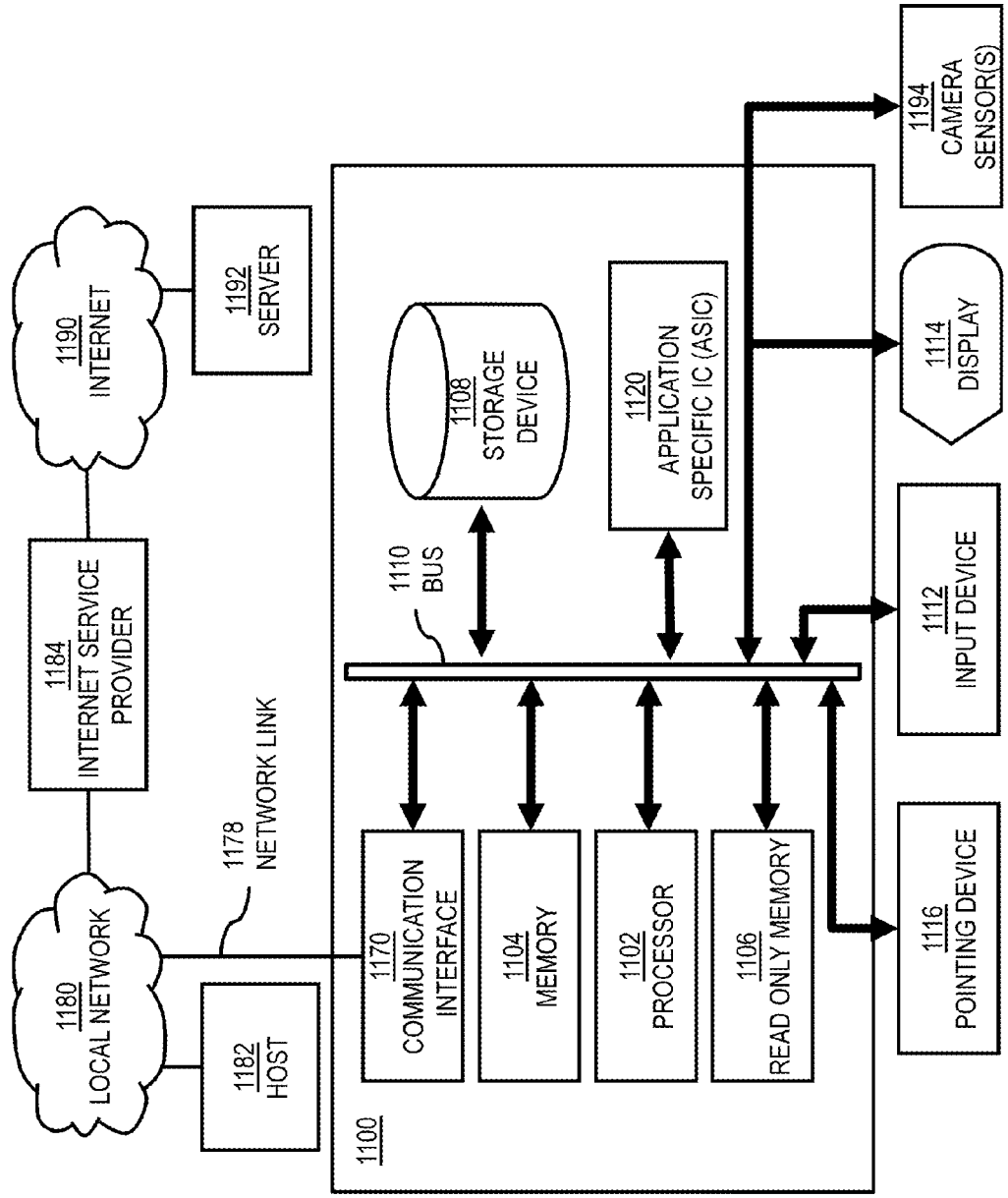
FIG. 11 is a diagram of hardware that can be used to implement an embodiment of the invention.

FIG. 11 illustrates a computer system 1100 upon which an embodiment of the invention may be implemented. Although computer system 1100 is depicted with respect to a particular device or equipment, it is contemplated that other devices or equipment (e.g., network elements, servers, etc.) within FIG. 11 can deploy the illustrated hardware and components of system 1100. Computer system 1100 is programmed (e.g., via computer program code or instructions) to cause a transmission of routing information to the at least one recipient device without a navigation application using one or more networking services as described herein and includes a communication mechanism such as a bus 1110 for passing information between other internal and external components of the computer system 1100. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1100, or a portion thereof, constitutes a means for performing one or more steps of causing a transmission of routing information to the at least one recipient device without a navigation application using one or more networking services.

A bus 1110 includes one or more parallel conductors of information so that information is transferred quickly among devices coupled to the bus 1110. One or more processors 1102 for processing information are coupled with the bus 1110.

A processor (or multiple processors) 1102 performs a set of operations on information as specified by computer program code related to cause a transmission of routing information to the at least one recipient device without a navigation application using one or more networking services. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1110 and placing information on the bus 1110. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1102, such as a sequence of operation codes, constitute processor instructions, also called computer system instructions or, simply, computer instructions. Processors may be implemented as mechanical, electrical, magnetic, optical, chemical, or quantum components, among others, alone or in combination.

Computer system 1100 also includes a memory 1104 coupled to bus 1110. The memory 1104, such as a random access memory (RAM) or any other dynamic storage device, stores information including processor instructions for causing a transmission of routing information to the at least one recipient device without a navigation application using one or more networking services. Dynamic memory allows information stored therein to be changed by the computer system 1100. RAM allows a unit of information stored at a location called a memory address to be stored and retrieved independently of information at neighboring addresses. The memory 1104 is also used by the processor 1102 to store temporary values during execution of processor instructions. The computer system 1100 also includes a read only memory (ROM) 1106 or any other static storage device coupled to the bus 1110 for storing static information, including instructions, that is not changed by the computer system 1100. Some memory is composed of volatile storage that loses the information stored thereon when power is lost. Also coupled to bus 1110 is a non-volatile (persistent) storage device 1108, such as a magnetic disk, optical disk or flash card, for storing information, including instructions, that persists even when the computer system 1100 is turned off or otherwise loses power.

Information, including instructions for causing a transmission of routing information to the at least one recipient device without a navigation application using one or more networking services, is provided to the bus 1110 for use by the processor from an external input device 1112, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 1100. Other external devices coupled to bus 1110, used primarily for interacting with humans, include a display device 1114, such as a cathode ray tube (CRT), a liquid crystal display (LCD), a light emitting diode (LED) display, an organic LED (OLED) display, a plasma screen, or a printer for presenting text or images, and a pointing device 1116, such as a mouse, a trackball, cursor direction keys, or a motion sensor, for controlling a position of a small cursor image presented on the display 1114 and issuing commands associated with graphical elements presented on the display 1114, and one or more camera sensors 1194 for capturing, recording and causing to store one or more still and/or moving images (e.g., videos, movies, etc.) which also may comprise audio recordings. In some embodiments, for example, in embodiments in which the computer system 1100 performs all functions automatically without human input, one or more of external input device 1112, display device 1114 and pointing device 1116 may be omitted.

In the illustrated embodiment, special purpose hardware, such as an application specific integrated circuit (ASIC) 1120, is coupled to bus 1110. The special purpose hardware is configured to perform operations not performed by processor 1102 quickly enough for special purposes. Examples of ASICs include graphics accelerator cards for generating images for display 1114, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1100 also includes one or more instances of a communications interface 1170 coupled to bus 1110. Communication interface 1170 provides a one-way or two-way communication coupling to a variety of external devices that operate with their own processors, such as printers, scanners and external disks. In general the coupling is with a network link 1178 that is connected to a local network 1180 to which a variety of external devices with their own processors are connected. For example, communication interface 1170 may be a parallel port or a serial port or a universal serial bus (USB) port on a personal computer. In some embodiments, communications interface 1170 is an integrated services digital network (ISDN) card or a digital subscriber line (DSL) card or a telephone modem that provides an information communication connection to a corresponding type of telephone line. In some embodiments, a communication interface 1170 is a cable modem that converts signals on bus 1110 into signals for a communication connection over a coaxial cable or into optical signals for a communication connection over a fiber optic cable. As another example, communications interface 1170 may be a local area network (LAN) card to provide a data communication connection to a compatible LAN, such as Ethernet. Wireless links may also be implemented. For wireless links, the communications interface 1170 sends or receives or both sends and receives electrical, acoustic or electromagnetic signals, including infrared and optical signals, that carry information streams, such as digital data. For example, in wireless handheld devices, such as mobile telephones like cell phones, the communications interface 1170 includes a radio band electromagnetic transmitter and receiver called a radio transceiver. In certain embodiments, the communications interface 1170 enables connection to the communication network 107 for causing a transmission of routing information to the at least one recipient device without a navigation application using one or more networking services to the UE 101.

The term "computer-readable medium" as used herein refers to any medium that participates in providing information to processor 1102, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 1108. Volatile media include, for example, dynamic memory 1104. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1120.

Network link 1178 typically provides information communication using transmission media through one or more networks to other devices that use or process the information. For example, network link 1178 may provide a connection through local network 1180 to a host computer 1182 or to equipment 1184 operated by an Internet Service Provider (ISP). ISP equipment 1184 in turn provides data communication services through the public, world-wide packet-switching communication network of networks now commonly referred to as the Internet 1190.

A computer called a server host 1192 connected to the Internet hosts a process that provides a service in response to information received over the Internet. For example, server host 1192 hosts a process that provides information representing video data for presentation at display 1114. It is contemplated that the components of system 1100 can be deployed in various configurations within other computer systems, e.g., host 1182 and server 1192.

At least some embodiments of the invention are related to the use of computer system 1100 for implementing some or all of the techniques described herein. According to one embodiment of the invention, those techniques are performed by computer system 1100 in response to processor 1102 executing one or more sequences of one or more processor instructions contained in memory 1104. Such instructions, also called computer instructions, software and program code, may be read into memory 1104 from another computer-readable medium such as storage device 1108 or network link 1178. Execution of the sequences of instructions contained in memory 1104 causes processor 1102 to perform one or more of the method steps described herein. In alternative embodiments, hardware, such as ASIC 1120, may be used in place of or in combination with software to implement the invention. Thus, embodiments of the invention are not limited to any specific combination of hardware and software, unless otherwise explicitly stated herein.

The signals transmitted over network link 1178 and other networks through communications interface 1170, carry information to and from computer system 1100. Computer system 1100 can send and receive information, including program code, through the networks 1180, 1190 among others, through network link 1178 and communications interface 1170. In an example using the Internet 1190, a server host 1192 transmits program code for a particular application, requested by a message sent from computer 1100, through Internet 1190, ISP equipment 1184, local network 1180 and communications interface 1170. The received code may be executed by processor 1102 as it is received, or may be stored in memory 1104 or in storage device 1108 or any other non-volatile storage for later execution, or both. In this manner, computer system 1100 may obtain application program code in the form of signals on a carrier wave.

Various forms of computer readable media may be involved in carrying one or more sequence of instructions or data or both to processor 1102 for execution. For example, instructions and data may initially be carried on a magnetic disk of a remote computer such as host 1182. The remote computer loads the instructions and data into its dynamic memory and sends the instructions and data over a telephone line using a modem. A modem local to the computer system 1100 receives the instructions and data on a telephone line and uses an infra-red transmitter to convert the instructions and data to a signal on an infra-red carrier wave serving as the network link 1178. An infrared detector serving as communications interface 1170 receives the instructions and data carried in the infrared signal and places information representing the instructions and data onto bus 1110. Bus 1110 carries the information to memory 1104 from which processor 1102 retrieves and executes the instructions using some of the data sent with the instructions. The instructions and data received in memory 1104 may optionally be stored on storage device 1108, either before or after execution by the processor 1102.

FIG. 12 illustrates a chip set or chip 1200 upon which an embodiment of the invention may be implemented. Chip set 1200 is programmed to cause a transmission of routing information to the at least one recipient device without a navigation application using one or more networking services as described herein and includes, for instance, the processor and memory components described with respect to FIG. 11 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1200 can be implemented in a single chip. It is further contemplated that in certain embodiments the chip set or chip 1200 can be implemented as a single "system on a chip." It is further contemplated that in certain embodiments a separate ASIC would not be used, for example, and that all relevant functions as disclosed herein would be performed by a processor or processors. Chip set or chip 1200, or a portion thereof, constitutes a means for performing one or more steps of providing user interface navigation information associated with the availability of functions. Chip set or chip 1200, or a portion thereof, constitutes a means for performing one or more steps of causing a transmission of routing information to the at least one recipient device without a navigation application using one or more networking services.

In one embodiment, the chip set or chip 1200 includes a communication mechanism such as a bus 1201 for passing information among the components of the chip set 1200. A processor 1203 has connectivity to the bus 1201 to execute instructions and process information stored in, for example, a memory 1205. The processor 1203 may include one or more processing cores with each core configured to perform independently. A multi-core processor enables multiprocessing within a single physical package. Examples of a multi-core processor include two, four, eight, or greater numbers of processing cores. Alternatively or in addition, the processor 1203 may include one or more microprocessors configured in tandem via the bus 1201 to enable independent execution of instructions, pipelining, and multithreading. The processor 1203 may also be accompanied with one or more specialized components to perform certain processing functions and tasks such as one or more digital signal processors (DSP) 1207, or one or more application-specific integrated circuits (ASIC) 1209. A DSP 1207 typically is configured to process real-world signals (e.g., sound) in real time independently of the processor 1203. Similarly, an ASIC 1209 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 1200 includes merely one or more processors and some software and/or firmware supporting and/or relating to and/or for the one or more processors.

The processor 1203 and accompanying components have connectivity to the memory 1205 via the bus 1201. The memory 1205 includes both dynamic memory (e.g., RAM, magnetic disk, writable optical disk, etc.) and static memory (e.g., ROM, CD-ROM, etc.) for storing executable instructions that when executed perform the inventive steps described herein to cause a transmission of routing information to the at least one recipient device without a navigation application using one or more networking services. The memory 1205 also stores the data associated with or generated by the execution of the inventive steps.

Figure 13:
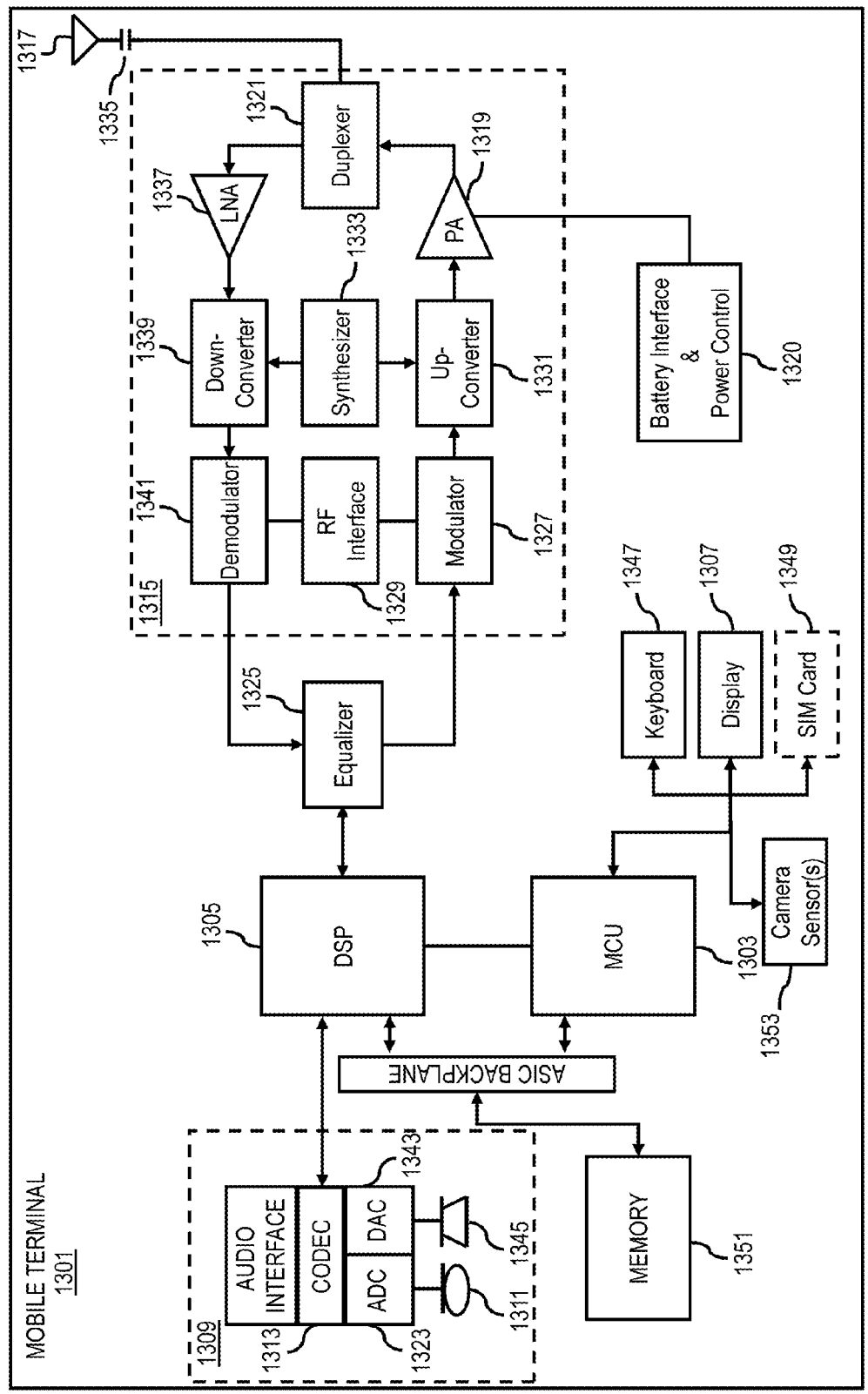
FIG. 13 is a diagram of a mobile terminal (e.g., handset) that can be used to implement an embodiment of the invention.

FIG. 13 is a diagram of exemplary components of a mobile terminal (e.g., handset) for communications, which is capable of operating in the system of FIG. 1, according to one embodiment. In some embodiments, mobile terminal 1301, or a portion thereof, constitutes a means for performing one or more steps of causing a transmission of routing information to the at least one recipient device without a navigation application using one or more networking services. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1303, a Digital Signal Processor (DSP) 1305, and a receiver/transmitter unit including a microphone gain control unit and a speaker gain control unit. A main display unit 1307 provides a display to the user in support of various applications and mobile terminal functions that perform or support the steps of causing a transmission of routing information to the at least one recipient device without a navigation application using one or more networking services. The display 1307 includes display circuitry configured to display at least a portion of a user interface of the mobile terminal (e.g., mobile telephone). Additionally, the display 1307 and display circuitry are configured to facilitate user control of at least some functions of the mobile terminal. An audio function circuitry 1309 includes a microphone 1311 and microphone amplifier that amplifies the speech signal output from the microphone 1311. The amplified speech signal output from the microphone 1311 is fed to a coder/decoder (CODEC) 1313.

A radio section 1315 amplifies power and converts frequency in order to communicate with a base station, which is included in a mobile communication system, via antenna 1317. The power amplifier (PA) 1319 and the transmitter/modulation circuitry are operationally responsive to the MCU 1303, with an output from the PA 1319 coupled to the duplexer 1321 or circulator or antenna switch, as known in the art. The PA 1319 also couples to a battery interface and power control unit 1320.

In use, a user of mobile terminal 1301 speaks into the microphone 1311 and his or her voice along with any detected background noise is converted into an analog voltage. The analog voltage is then converted into a digital signal through the Analog to Digital Converter (ADC) 1323. The control unit 1303 routes the digital signal into the DSP 1305 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1325 for compensation of any frequency-dependent impairments that occur during transmission though the air such as phase and amplitude distortion. After equalizing the bit stream, the modulator 1327 combines the signal with a RF signal generated in the RF interface 1329. The modulator 1327 generates a sine wave by way of frequency or phase modulation. In order to prepare the signal for transmission, an up-converter 1331 combines the sine wave output from the modulator 1327 with another sine wave generated by a synthesizer 1333 to achieve the desired frequency of transmission. The signal is then sent through a PA 1319 to increase the signal to an appropriate power level. In practical systems, the PA 1319 acts as a variable gain amplifier whose gain is controlled by the DSP 1305 from information received from a network base station. The signal is then filtered within the duplexer 1321 and optionally sent to an antenna coupler 1335 to match impedances to provide maximum power transfer. Finally, the signal is transmitted via antenna 1317 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1301 are received via antenna 1317 and immediately amplified by a low noise amplifier (LNA) 1337. A down-converter 1339 lowers the carrier frequency while the demodulator 1341 strips away the RF leaving only a digital bit stream. The signal then goes through the equalizer 1325 and is processed by the DSP 1305. A Digital to Analog Converter (DAC) 1343 converts the signal and the resulting output is transmitted to the user through the speaker 1345, all under control of a Main Control Unit (MCU) 1303 which can be implemented as a Central Processing Unit (CPU).

The MCU 1303 receives various signals including input signals from the keyboard 1347. The keyboard 1347 and/or the MCU 1303 in combination with other user input components (e.g., the microphone 1311) comprise a user interface circuitry for managing user input. The MCU 1303 runs a user interface software to facilitate user control of at least some functions of the mobile terminal 1301 to cause a transmission of routing information to the at least one recipient device without a navigation application using one or more networking services. The MCU 1303 also delivers a display command and a switch command to the display 1307 and to the speech output switching controller, respectively. Further, the MCU 1303 exchanges information with the DSP 1305 and can access an optionally incorporated SIM card 1349 and a memory 1351. In addition, the MCU 1303 executes various control functions required of the terminal. The DSP 1305 may, depending upon the implementation, perform any of a variety of conventional digital processing functions on the voice signals. Additionally, DSP 1305 determines the background noise level of the local environment from the signals detected by microphone 1311 and sets the gain of microphone 1311 to a level selected to compensate for the natural tendency of the user of the mobile terminal 1301.

The CODEC 1313 includes the ADC 1323 and DAC 1343. The memory 1351 stores various data including call incoming tone data and is capable of storing other data including music data received via, e.g., the global Internet. The software module could reside in RAM memory, flash memory, registers, or any other form of writable storage medium known in the art. The memory device 1351 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1349 carries, for instance, important information, such as the cellular phone number, the carrier supplying service, subscription details, and security information. The SIM card 1349 serves primarily to identify the mobile terminal 1301 on a radio network. The card 1349 also contains a memory for storing a personal telephone number registry, text messages, and user specific mobile terminal settings.

Further, one or more camera sensors 1353 may be incorporated onto the mobile station 1301 wherein the one or more camera sensors may be placed at one or more locations on the mobile station. Generally, the camera sensors may be utilized to capture, record, and cause to store one or more still and/or moving images (e.g., videos, movies, etc.) which also may comprise audio recordings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
    processing, by an apparatus, at least one request to share navigation routing information from at least one first device to at least one second device;
    making, by the apparatus, a determination that at least one navigation application that presents the navigation routing information on a user interface of the at least one first device is not installed on the at least one second device, and the at least one second device has registered with one or more social network services; and
    in response to the determination, initiating, by the apparatus, a transmission of one or more images, one or more audio recordings, or a combination thereof, of the navigation routing information captured at the at least one first device to the at least one second device using a real time chat via one of the social network services.

2. A method of claim 1, further comprising:
    receiving a selection of one or more contacts of a user of the at least one first device,
    wherein the at least one second device is determined based on the selection, and the at least one second device has no active connection with navigation services.

3. A method of claim 1, further comprising:
    triggering the transmission of the at least one capture based on location information and a travel speed associated with the at least one second device, wherein the transmission is in at least one image format, at least one message format, at least one video format, at least one audio format, or a combination thereof; and
    initiating a transmission of a confirmation to the at least one second device that the at least one second device is travelling on a straight road and in a right direction in place of the at least one capture.

4. A method of claim 3, further comprising:
    processing the location information to determine whether the at least one second device is within a proximity of one or more navigation locations depicted in the least one capture,
    wherein the triggering of the transmission of the least one capture is further based on the proximity.

5. A method of claim 3, further comprising:
    receiving the location information periodically, according to a schedule, on demand, or a combination thereof; and
    initiating at least one enhancement of the one or more images, the one or more audio recordings, or a combination thereof, before the transmission.

6. A method of claim 1, further comprising:
    initiating a presentation at the at least one first device of the one or more social network services that the at least one second device has registered with; and
    receiving, at the at least one first device, a user selection of the one of the social network services,
    wherein the at least one capture includes, at least in part, one or more image captures of at least one screen of the at least one first device presenting the navigation routing information, and the navigation routing information involves off-road navigation.

7. A method of claim 1, wherein the at least one capture is triggered at the at least one first device based on (a) at least one presentation of one or more navigation instructions, (b) at least one performance of one or more navigation maneuvers, (c) an occurrence of one or more navigation-related events, (d) contextual information associated with the at least one navigation route, or (e) a combination thereof,
    wherein the one or more images, the one or more audio recordings, or a combination thereof, are captured by one or more sensors of the at least one first device.

8. A method of claim 1, further comprising:
    determining that there are a plurality of the at least one first device sharing the navigation of the routing information; and
    a selection of the plurality of the at least one first device to share the at least one capture based on one or more selection criteria, wherein the one or more selection criteria include a travel speed.

9. A method of claim 1, wherein
    the at least one capture is transmitted from at least one originating communication account associated with the at least one first device, at least one anonymous account, at least one navigation service, or a combination thereof.

10. A method of claim 1, further comprising:
initiating a generation of at least one route overview, a full maneuver list, or a combination thereof, at the at least one first device; and
initiating a transmission of the at least one route overview, the full maneuver list, or a combination thereof, to the at least one second device using the real time chat.

11. An apparatus comprising:
at least one processor; and
at least one memory including computer program code for one or more programs,
the at least one memory and the computer program code configured to, with the at least one processor, cause the apparatus to perform at least the following,
process at least one request to share navigation routing information from at least one first device to at least one second device;
make a determination that at least one navigation application that presents the navigation routing information on a user interface of the at least one first device is not installed on the at least one second device, and the at least one second device has registered with one or more social network services; and
in response to the at least one determination, initiate a transmission of one or more images, one or more audio recordings, or a combination thereof, of the navigation routing information captured at the at least one first device to the at least one second device using a real time chat via one of the social network services.

12. An apparatus of claim 11, wherein the apparatus is further caused to:
receive a selection of one or more contacts of a user of the at least one first device, wherein the at least one second device is determined based on the selection.

13. An apparatus of claim 11, wherein the apparatus is further caused to:
trigger the transmission of the at least one capture based on location information and a travel speed associated with the at least one second device.

14. An apparatus of claim 13, wherein the apparatus is further caused to:
process the location information to determine whether the at least one second device is within a proximity of one or more navigation locations depicted in the least one capture,
wherein the triggering of the transmission of the least one capture is further based on the proximity.

15. An apparatus of claim 13, wherein the apparatus is further caused to:
receive the location information periodically, according to a schedule, on demand, or a combination thereof.

16. An apparatus of claim 11, wherein the apparatus is further caused to:
determine that there are a plurality of the at least one first device sharing the navigation of the routing information; and
initiate a selection of the plurality of the at least one first device to share the at least one capture based on one or more selection criteria,
wherein the one or more selection criteria include, at least in part, an extent of progress along at least one navigation route, a travel speed, a travel order, or a combination thereof.

17. An apparatus of claim 11, wherein the apparatus is further caused to:
initiate an origination of the transmission of the at least one capture from at least one originating communication account associated with the at least one first device, at least one anonymous account, at least one navigation service, or a combination thereof.

18. A non-transitory computer-readable storage medium carrying one or more sequences of one or more instructions which, when executed by one or more processors, cause an apparatus to at least perform the following steps:
processing at least one request to share navigation routing information from at least one first device to at least one second device;
making a determination that at least one navigation application that presents the navigation routing information on a user interface of the at least one first device is not installed on the at least one second device, and the at least one second device has registered with one or more social network services; and
in response to the at least one determination, initiating a transmission of one or more images, one or more audio recordings, or a combination thereof, of the navigation routing information captured at the at least one first device to the at least one second device using a real time chat via one of the social network services.

19. A non-transitory computer-readable storage medium of claim 18, wherein the apparatus is caused to further perform:
receiving a selection of one or more contacts of a user of the at least one first device, wherein the at least one second device is determined based on the selection.

20. A non-transitory computer-readable storage medium of claim 18, wherein the apparatus is caused to further perform:
triggering the transmission of the at least one capture based on location information and a travel speed associated with the at least one second device.

* * * * *